United States Patent
Lin et al.

(10) Patent No.: US 12,456,030 B2
(45) Date of Patent: Oct. 28, 2025

(54) PHASE SELECTIVE CONVOLUTION WITH DYNAMIC WEIGHT SELECTION

(71) Applicant: QUALCOMM Incorporated, San Diego, CA (US)

(72) Inventors: Jamie Menjay Lin, San Diego, CA (US); Yang Yang, San Diego, CA (US); Parham Noorzad, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 707 days.

(21) Appl. No.: 17/098,049

(22) Filed: Nov. 13, 2020

(65) Prior Publication Data

US 2021/0150306 A1     May 20, 2021

Related U.S. Application Data

(60) Provisional application No. 62/935,421, filed on Nov. 14, 2019, provisional application No. 62/935,425, filed on Nov. 14, 2019.

(51) Int. Cl.
*G06N 3/02* (2006.01)
*G06F 17/15* (2006.01)
*G06F 17/16* (2006.01)

(52) U.S. Cl.
CPC .............. *G06N 3/02* (2013.01); *G06F 17/15* (2013.01); *G06F 17/16* (2013.01)

(58) Field of Classification Search
CPC .......... G06N 3/02; G06N 3/045; G06N 3/048; G06N 3/084; G06F 17/15; G06F 17/16
See application file for complete search history.

(56) References Cited

U.S. PATENT DOCUMENTS

| | | |
|---|---|---|
| 10,049,323 B1 | 8/2018 | Kim et al. |
| 10,373,050 B2 | 8/2019 | Lin et al. |
| 10,831,444 B2 | 11/2020 | El-Yaniv et al. |

(Continued)

OTHER PUBLICATIONS

Tang, Zhimin, et al. "A joint residual network with paired ReLUs activation for image super-resolution." Neurocomputing 273 (2018): 37-46. (Year: 2018).*

(Continued)

*Primary Examiner* — Li B. Zhen
*Assistant Examiner* — Henry Nguyen
(74) *Attorney, Agent, or Firm* — Patterson & Sheridan LLP

(57) ABSTRACT

Aspects described herein provide a method of performing phase selective convolution, including: receiving multi-phase pre-activation activation data; partitioning the multi-phase pre-activation data; applying a first activation function to the set of first phase pre-activation data to form a set of first phase activation output; convolving the set of first phase activation output with a first convolution kernel to form a first phase output feature map; negating the set of second phase activation data; applying a second activation function to the negated set of second phase pre-activation data to form a set of second phase activation output; convolving the set of second phase activation output with a second convolution kernel to form a second phase output feature map; negating the second phase output feature map; and training the neural network based on the first phase output feature map and the second phase output feature map.

23 Claims, 12 Drawing Sheets

(56) References Cited

U.S. PATENT DOCUMENTS

| | | | |
|---|---|---|---|
| 10,983,754 B2 | 4/2021 | Vantrease et al. | |
| 11,276,132 B2 | 3/2022 | Jung et al. | |
| 11,294,628 B2 | 4/2022 | Jang | |
| 2016/0358070 A1* | 12/2016 | Brothers | G06N 3/082 |
| 2019/0339939 A1* | 11/2019 | Ito | G06F 9/38 |
| 2019/0370660 A1* | 12/2019 | Wong | G06N 3/084 |
| 2020/0111001 A1* | 4/2020 | Croxford | G06T 5/20 |
| 2020/0167943 A1* | 5/2020 | Kim | G06T 7/579 |
| 2020/0285939 A1* | 9/2020 | Baker | G06N 7/01 |
| 2021/0103473 A1* | 4/2021 | Lin | G06N 3/045 |
| 2021/0287095 A1 | 9/2021 | Lin | |

OTHER PUBLICATIONS

Yamashita R, Nishio M, Do RK, Togashi K. Convolutional neural networks: an overview and application in radiology. Insights into imaging. Aug. 2018;9:611-29. (Year: 2018).*

Gu J., et al., "Recent Advances in Convolutional Neural Networks", 2017.

International Search Report and Written Opinion—PCT/US2020/060763—ISA/EPO—Mar. 10, 2021.

O'shea K., et al., "An Introduction to Convolutional Neural Networks", Dec. 2, 2015 (Dec. 2, 2015), pp. 1-11, KP055491019, arXiv.org, Retrieved from the Internet: URL: https://arxiv.org/pdf/1511.08458.pdf. [Retrieved on Jul. 9, 2018].

Shang W., et al., "Understanding and Improving Convolutional Neural Networks via Concatenated Rectified Linear Units", arxiv.org, Cornell University Library, 201 Olin Library Cornell University Ithaca, NY 14853, Mar. 16, 2016 (Mar. 16, 2016), 17 Pages, XP080690153, The whole document.

Toderici G., et al., Variable Rate Image Compression with Recurrent Neural Networks, 2016.

Wang J., et al., "Design Flow of Accelerating Hybrid Extremely Low Bit-width Neural Network in Embedded FPGA", 2018, 7 Pages.

Zhang C., et al., "Optimizing FPGA-Based Accelerator Design for Deep Convolutional Neural Networks", 2015, pp. 161-170.

Zhou H., et al., "Deep Networks with Non-Static Activation Function", Multimedia Tools and Applications, Kluwer Academic Publishers, Boston, US, vol. 78, No. 1, Jan. 31, 2018 (Jan. 31, 2018), pp. 197-211, XP036695246, ISSN: 1380-7501, DOI: 10.1007/S11042-018-5702-5, [retrieved on Jan. 31, 2018], Section 3.

Zhou H., et al., "Deep Networks with Non-Static Activation Function", Multimedia Tools and Applications, vol. 78, No. 1, Jan. 31, 2018, pp. 197-211.

* cited by examiner

PHASE SELECTIVE CONVOLUTION WITH DYNAMIC WEIGHT SELECTION

CROSS-REFERENCE TO RELATED APPLICATIONS

This Application claims the benefit of and priority to U.S. Provisional Patent Application No. 62/935,421, filed on Nov. 14, 2019, and U.S. Provisional Patent Application No. 62/935,425, filed on Nov. 14, 2019, the entire contents of each of which are incorporated by reference herein.

INTRODUCTION

Aspects of the present disclosure relate to machine learning models, and in particular to phase selective convolutions with dynamic weight selection in machine learning models.

Machine learning may produce a trained model (e.g., an artificial neural network, a tree, or other structures), which represents a generalized fit to a set of training data that is known a priori. Applying the trained model to new data produces inferences, which may be used to gain insights into the new data. In some cases, applying the model to the new data is described as "running an inference" on the new data.

Convolutional neural networks are one example of machine learning models used for generating inferences. Convolutional neural network models generally include convolution layers that use kernels of various sizes as well as other operations, such as batch normalization, pooling, and activation, to name a few examples.

Convolutional neural networks often employ non-linear activation functions, which conventionally output a single "phase" of activation information and suppress or discard other phases of activation information. For example, a non-linear activation function may output "positive" information related to an image including a particular feature while suppressing "negative" information related to the image not including the particular feature. This conventional single (or uni-) phase approach may help to limit the complexity of machine learning models, but it comes at the expense of not learning from the suppressed activation information and thus producing models with lower accuracy.

Accordingly, what are needed are improved machine learning methods for learning from discarded phase information without increasing the complexity of a model.

BRIEF SUMMARY

In a first aspect, a method of performing phase selective convolution, includes: receiving multi-phase pre-activation activation data; partitioning the multi-phase pre-activation data into a set of first phase pre-activation data and a set of second phase pre-activation data; applying a first activation function to the set of first phase pre-activation data to form a set of first phase activation output; convolving the set of first phase activation output with a first convolution kernel to form a first phase output feature map; negating the set of second phase activation data; applying a second activation function to the negated set of second phase pre-activation data to form a set of second phase activation output; convolving the set of second phase activation output with a second convolution kernel to form a second phase output feature map; negating the second phase output feature map; and training the neural network based on the first phase output feature map and the second phase output feature map.

In a second aspect, a processing system configured to perform phase selective convolution in a neural network, includes: a memory comprising computer-executable instructions; one or more processors configured to execute the computer-executable instructions and cause the processing system to: receive multi-phase pre-activation activation data; partition the multi-phase pre-activation data into a set of first phase pre-activation data and a set of second phase pre-activation data; apply a first activation function to the set of first phase pre-activation data to form a set of first phase activation output; convolve the set of first phase activation output with a first convolution kernel to form a first phase output feature map; negate the set of second phase activation data; apply a second activation function to the negated set of second phase pre-activation data to form a set of second phase activation output; convolve the set of second phase activation output with a second convolution kernel to form a second phase output feature map; negate the second phase output feature map; and train the neural network based on the first phase output feature map and the second phase output feature map.

In a third aspect, a non-transitory computer-readable medium includes instructions that, when executed by one or more processors of a processing system, cause the processing system to perform a method of performing phase selective convolution in a neural network, the method comprising: receiving multi-phase pre-activation activation data; partitioning the multi-phase pre-activation data into a set of first phase pre-activation data and a set of second phase pre-activation data; applying a first activation function to the set of first phase pre-activation data to form a set of first phase activation output; convolving the set of first phase activation output with a first convolution kernel to form a first phase output feature map; negating the set of second phase activation data; applying a second activation function to the negated set of second phase pre-activation data to form a set of second phase activation output; convolving the set of second phase activation output with a second convolution kernel to form a second phase output feature map; negating the second phase output feature map; and training the neural network based on the first phase output feature map and the second phase output feature map.

In a fourth aspect, a processing system configured to perform phase selective convolution in a neural network, includes means for receiving multi-phase pre-activation activation data; means for partitioning the multi-phase pre-activation data into a set of first phase pre-activation data and a set of second phase pre-activation data; means for applying a first activation function to the set of first phase pre-activation data to form a set of first phase activation output; means for convolving the set of first phase activation output with a first convolution kernel to form a first phase output feature map; means for negating the set of second phase activation data; means for applying a second activation function to the negated set of second phase pre-activation data to form a set of second phase activation output; means for convolving the set of second phase activation output with a second convolution kernel to form a second phase output feature map; means for negating the second phase output feature map; and means for training the neural network based on the first phase output feature map and the second phase output feature map.

In a fifth aspect, a method of inferencing with a neural network comprising a phase selective convolution layer, includes: receiving multi-phase pre-activation data; partitioning the multi-phase pre-activation data into a set of first phase pre-activation data and a set of second phase pre-activation data; applying a first activation function to the set of first phase pre-activation data to form a set of first phase activation output; applying a second activation function to the negated set of second phase pre-activation data to form a set of second phase activation output; generating a phase selective convolution kernel based on a first phase convolution kernel and a second phase convolution kernel; performing a phase selective convolution based on the first phase activation output, the second phase activation output, and the phase selective convolution kernel; and outputting a feature map.

In a sixth aspect, a processing system configured to inference with a neural network comprising a phase selective convolution layer, comprising: a memory comprising computer-executable instructions; one or more processors configured to execute the computer-executable instructions and cause the processing system to: receive multi-phase pre-activation data; partition the multi-phase pre-activation data into a set of first phase pre-activation data and a set of second phase pre-activation data; apply a first activation function to the set of first phase pre-activation data to form a set of first phase activation output; apply a second activation function to the negated set of second phase pre-activation data to form a set of second phase activation output; generate a phase selective convolution kernel based on a first phase convolution kernel and a second phase convolution kernel; perform a phase selective convolution based on the first phase activation output, the second phase activation output, and the phase selective convolution kernel; and output a feature map.

In a seventh aspect, a non-transitory computer-readable medium includes instructions that, when executed by one or more processors of a processing system, cause the processing system to perform a method of inferencing with a neural network comprising a phase selective convolution layer, the method comprising: receiving multi-phase pre-activation data; partitioning the multi-phase pre-activation data into a set of first phase pre-activation data and a set of second phase pre-activation data; applying a first activation function to the set of first phase pre-activation data to form a set of first phase activation output; applying a second activation function to the negated set of second phase pre-activation data to form a set of second phase activation output; generating a phase selective convolution kernel based on a first phase convolution kernel and a second phase convolution kernel; performing a phase selective convolution based on the first phase activation output, the second phase activation output, and the phase selective convolution kernel; and outputting a feature map.

In an eighth aspect, a processing system configured to inference with a neural network comprising a phase selective convolution layer, includes: means for receiving multi-phase pre-activation data; means for partitioning the multi-phase pre-activation data into a set of first phase pre-activation data and a set of second phase pre-activation data; means for applying a first activation function to the set of first phase pre-activation data to form a set of first phase activation output; means for applying a second activation function to the negated set of second phase pre-activation data to form a set of second phase activation output; means for generating a phase selective convolution kernel based on a first phase convolution kernel and a second phase convolution kernel; means for performing a phase selective convolution based on the first phase activation output, the second phase activation output, and the phase selective convolution kernel; and means for outputting a feature map.

Further embodiments relate to apparatuses configured to perform the methods described herein as well as non-transitory computer-readable mediums comprising computer-executable instructions that, when executed by a processor of a device, cause the device to perform the methods described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1A:
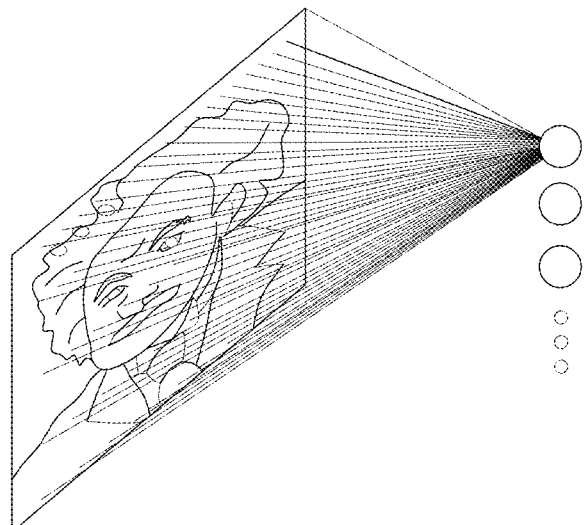
FIGS. 1A-1D depict examples of various types of neural networks.

Aspects of the present disclosure provide apparatuses, methods, processing systems, and computer readable mediums for performing phase selective convolution with dynamic weighting in neural networks.

Brief Background on Neural Networks, Deep Neural Networks, and Deep Learning

Neural networks are organized into layers of interconnected nodes. Generally, a node (or neuron) is where computation happens. For example, a node may combine input data with a set of weights (or coefficients) that either amplifies or dampens the input data. The amplification or dampening of the input signals may thus be considered an assignment of relative significances to various inputs with regard to a task the network is trying to learn. Generally, input-weight products are summed (or accumulated) and then the sum is passed through a node's activation function to determine whether and to what extent that signal should progress further through the network.

In a most basic implementation, a neural network may have an input layer, a hidden layer, and an output layer. "Deep" neural networks generally have more than one hidden layer.

Deep learning is a method of training deep neural networks. Generally, deep learning maps inputs to the network to outputs from the network and is thus sometimes referred to as a "universal approximator" because it can learn to approximate an unknown function $f(x)=y$ between any input x and any output y. In other words, deep learning finds the right $f$ to transform x into y.

More particularly, deep learning trains each layer of nodes based on a distinct set of features, which is the output from the previous layer. Thus, with each successive layer of a deep neural network, features become more complex. Deep learning is thus powerful because it can progressively extract higher level features from input data and perform complex tasks, such as object recognition, by learning to represent inputs at successively higher levels of abstraction in each layer, thereby building up a useful feature representation of the input data.

For example, if presented with visual data, a first layer of a deep neural network may learn to recognize relatively simple features, such as edges, in the input data. In another example, if presented with auditory data, the first layer of a deep neural network may learn to recognize spectral power in specific frequencies in the input data. The second layer of the deep neural network may then learn to recognize combinations of features, such as simple shapes for visual data or combinations of sounds for auditory data, based on the output of the first layer. Higher layers may then learn to recognize complex shapes in visual data or words in auditory data. Still higher layers may learn to recognize common visual objects or spoken phrases. Thus, deep learning architectures may perform especially well when applied to problems that have a natural hierarchical structure.

Layer Connectivity in Neural Networks

Neural networks, such as deep neural networks, may be designed with a variety of connectivity patterns between layers.

FIG. 1A illustrates an example of a fully connected neural network 102. In a fully connected neural network 102, a node in a first layer communicate its output to every node in a second layer, so that each node in the second layer will receive input from every node in the first layer. Further, each set of nodes in the second layer in a fully connected network is obtained by multiplying the set of nodes in the previous layer with a matrix kernel. The contents of the matrix kernel are weights, which are learnt during neural network training.

Figure 1B:
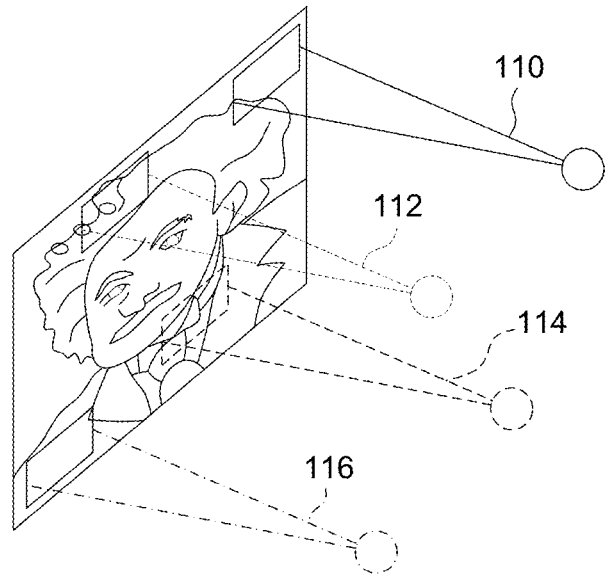

FIG. 1B illustrates an example of a locally connected neural network 104. In a locally connected neural network 104, a node in a first layer may be connected to a limited number of nodes in the second layer. More generally, a locally connected layer of the locally connected neural network 104 may be configured so that each node in a layer will have the same or a similar connectivity pattern, but with connections strengths (or weights) that may have different values (e.g., 110, 112, 114, and 116). The locally connected connectivity pattern may give rise to spatially distinct receptive fields in a higher layer, because the higher layer nodes in a given region may receive inputs that are tuned through training to the properties of a restricted portion of the total input to the network.

Figure 1C:
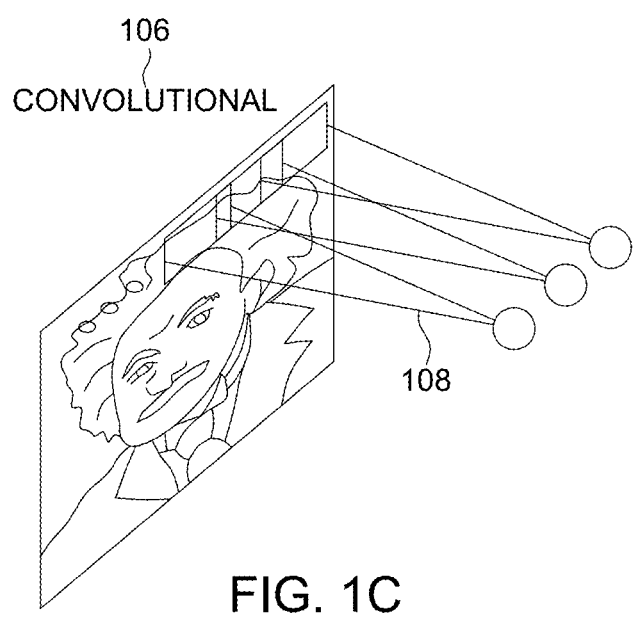

One type of locally connected neural network is a convolutional neural network. FIG. 1C illustrates an example of a convolutional neural network 106. Convolutional neural network 106 may be configured such that the connection strengths associated with the inputs for each node in the second layer are shared (e.g., 108). Convolutional neural networks are well-suited to problems in which the spatial location of inputs is meaningful.

One type of convolutional neural network is a deep convolutional network (DCN). Deep convolutional networks are networks of multiple convolutional layers, which may further be configured with, for example, pooling and normalization layers.

Figure 1D:
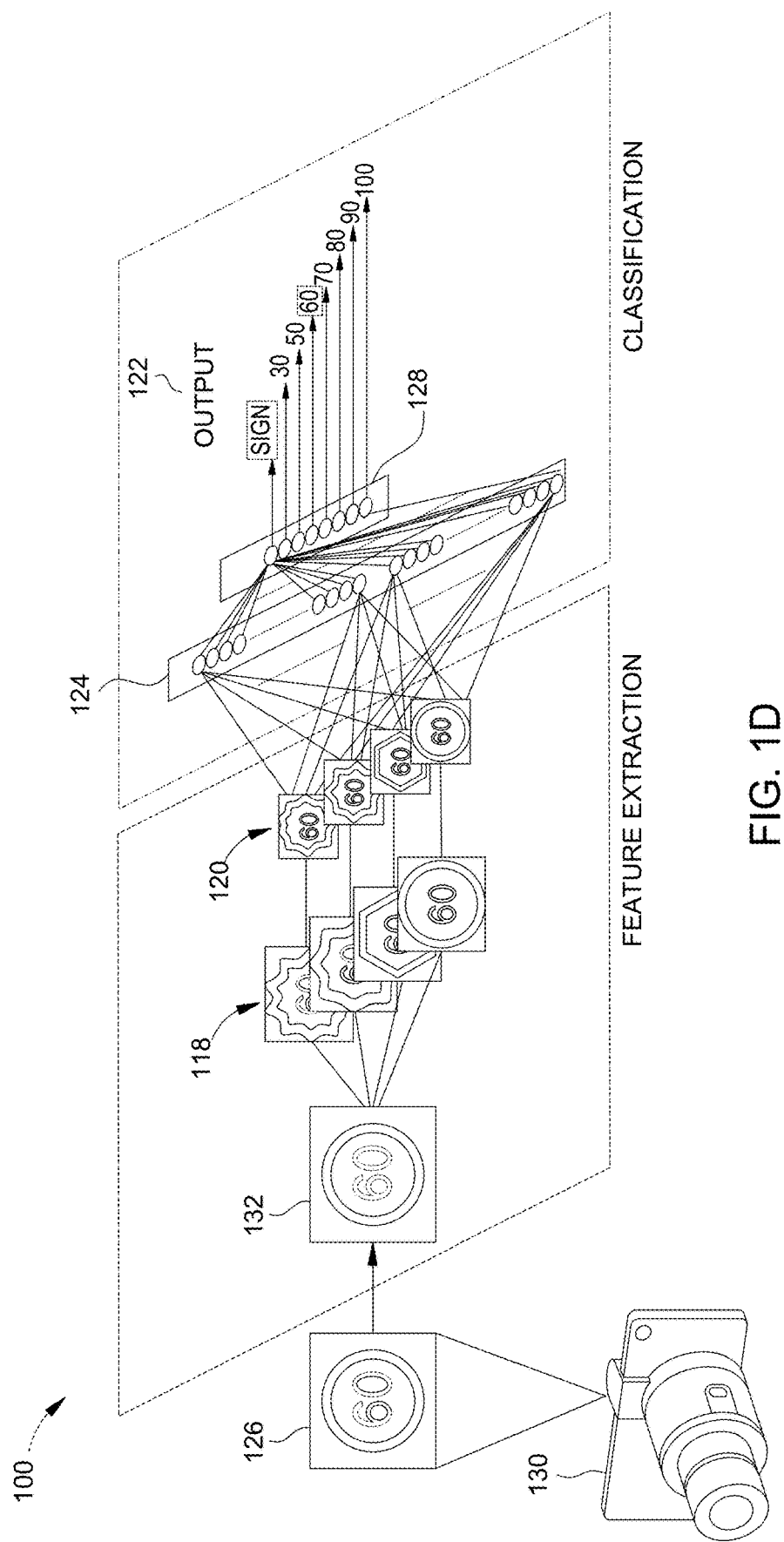

FIG. 1D illustrates an example of a DCN 100 designed to recognize visual features in an image 126 generated by an image capturing device 130. For example, if the image capturing device 130 was a camera mounted in a vehicle, then DCN 100 may be trained with various supervised learning techniques to identify a traffic sign and even a number on the traffic sign. DCN 100 may likewise be trained for other tasks, such as identifying lane markings or identifying traffic lights. These are just some example tasks, and many others are possible.

In this example, DCN 100 includes a feature extraction section and a classification section. Upon receiving the image 126, a convolutional layer 132 applies convolutional kernels (for example, as depicted and described in FIG. 2) to the image 126 to generate a first set of feature maps (or intermediate activations) 118. Generally, "kernels" and "filters" comprise multidimensional matrices of weights capable of emphasizing different aspects of an input data channel. In the present example, because four different feature maps are generated in the first set of feature maps 118, four different convolutional kernels are applied to the image 126 at the convolutional layer 132.

The first set of feature maps 118 may then be subsampled by a pooling layer (e.g., a max pooling layer, not shown) to generate a second set of feature maps 120. The pooling layer may reduce the size of the first set of feature maps 118 while maintain much of the information in order to improve model performance. For example, the second set of feature maps 120 may be down-sampled to 14×14 from 28×28 by the pooling layer.

This process may be repeated through many layers. In other words, the second set of feature maps 120 may be further convolved via one or more subsequent convolutional layers (not shown) to generate one or more subsequent sets of feature maps (not shown).

In the example of FIG. 1D, the second set of feature maps 120 is reshaped to generate a first set of nodes 124 (e.g., in a fully connected layer). Furthermore, the first set of nodes 124 is further connected to a second set of nodes in output layer 128 (e.g., another fully connected layer). Each node in the second set of nodes 128 may include a number that corresponds to a possible feature of the image 126, such as "sign," "60," and "100."

A softmax function (not shown) may convert the node outputs of the output layer 128 into various probabilities in order that an output 122 of DCN 100 is one or more probabilities of the image 126 including one or more features, such as a sign with the numbers "60" on it, as in input image 126. Thus, in the present example, the probabilities in the output 122 for "sign" and "60" should be higher than the probabilities of the others of the output 122, such as "30," "40," "50," "70," "80," "90," and "100".

Before training DCN 100, the output 122 produced by DCN 100 may be incorrect. Thus, an error may be calculated between the output 122 and a target output known a priori. For example, here the target output is an indication that the image 126 includes a "sign" and the number "60". Utilizing the known, target output, the weights of DCN 100 may then be adjusted through training so that subsequent output 122 of DCN 100 achieves the target output.

To adjust the weights of DCN 100, a learning algorithm may compute a gradient vector for the weights. The gradient may indicate an amount that an error would increase or decrease if a weight were adjusted in a particular way. The weights may then be adjusted to reduce the error. This manner of adjusting the weights may be referred to as "back propagation" as it involves a "backward pass" through the layers of DCN 100.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After training, DCN 100 may be presented with new images and DCN 100 may generate inferences, such as classifications, or probabilities of various features being in the new image.

Convolution Techniques for Convolutional Neural Networks

Convolution is generally used to extract useful features from an input data set. For example, in convolutional neural networks, such as described above, convolution enables the extraction of different features using kernels and/or filters whose weights are automatically learned during training. The extracted features are then combined to make inferences.

An activation function may be applied before and/or after each layer of a convolutional neural network. Activation functions are generally mathematical functions (e.g., equations) that determine the output of a node of a neural network. Thus, the activation function determines whether it a node should pass information or not, based on whether the node's input is relevant to the model's prediction. In one example, where y=Conv(x) (i.e., y=a convolution of x), both x and y may be generally considered as "activations". However, in terms of a particular convolution operation, x may also be referred to as "pre-activations" or "input activations" as it exists before the particular convolution and y may be referred to as output activations or a feature map.

Figure 2:
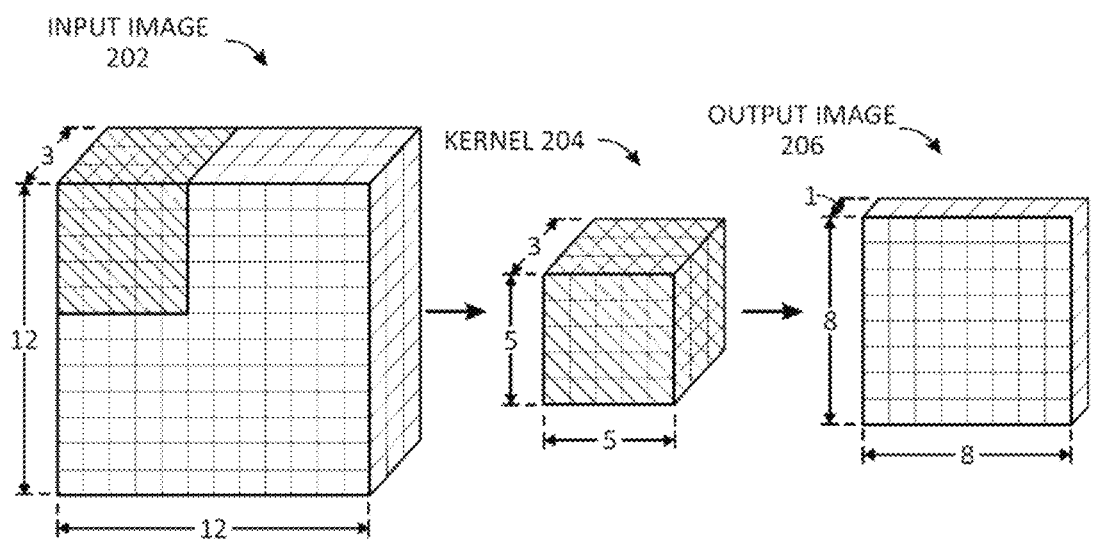
FIG. 2 depicts an example of a conventional convolution operation.

FIG. 2 depicts an example of a traditional convolution in which a 12 pixel×12 pixel×3 channel input image is convolved using a 5×5×3 convolution kernel 204. The resulting output image 206 is 8 pixels×8 pixels×1 channel. As seen in this example, the traditional convolution may change the dimensionality of the input data as compared to the output data (here, from 12×12 to 8×8 pixels), including the channel dimensionality (here, from 3 to 1 channel).

Figure 3A:
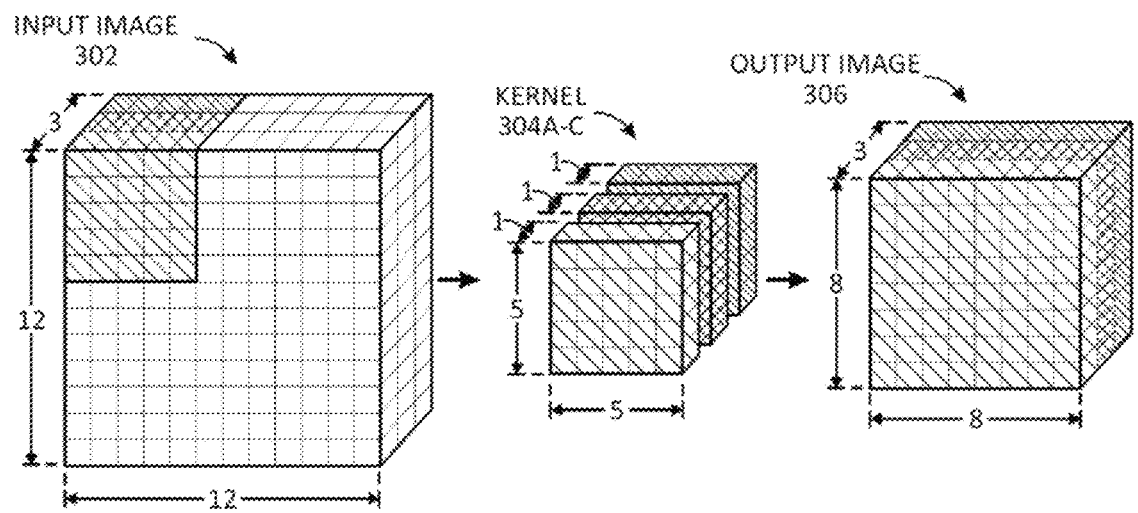
FIGS. 3A and 3B depicts examples of depthwise separable convolution operations.
Figure 3B:
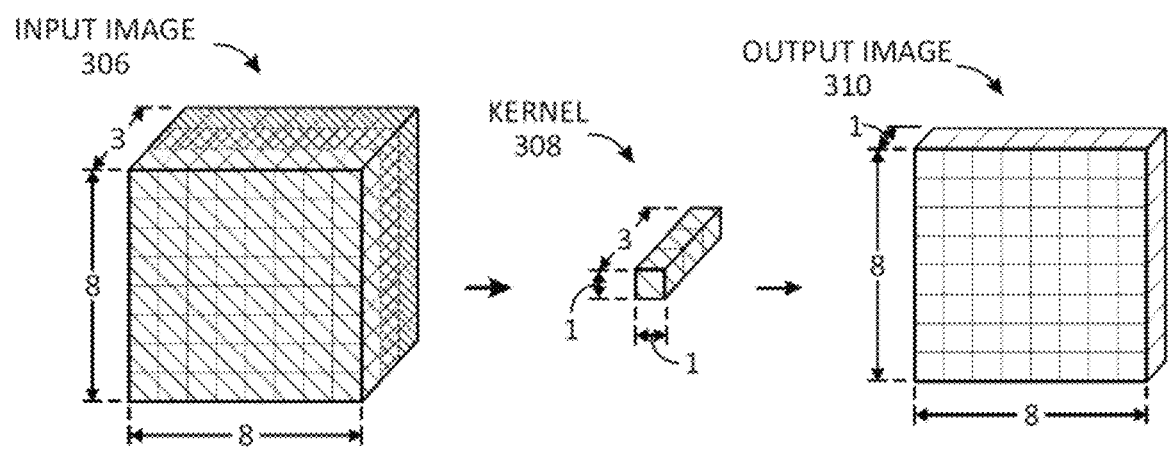

One way to reduce the computational burden (e.g., measured in floating point operations per second (FLOPs)) and the number parameters associated with a neural network comprising convolutional layers is to factorize the convolutional layers. For example, a spatial separable convolution, such as depicted in FIG. 2, may be factorized into two components: (1) a depthwise separable convolution, wherein each spatial channel is convolved independently by a depthwise convolution (e.g., a spatial fusion); and (2) a pointwise convolution, wherein all the spatial channels are linearly combined (e.g., a channel fusion). An examples of a depthwise separable convolution is depicted in FIGS. 3A and 3B. Generally, during spatial fusion, a network learns features from the spatial planes and during channel fusion the network learns relations between these features across channels.

In one example, a separable depthwise convolutions may be implemented using 3×3 kernels for spatial fusion, and 1×1 kernels for channel fusion. In particular, the channel fusion may use a 1×1×d kernel that iterates through every single point in an input image of depth d, wherein the depth d of the kernel generally matches the number of channels of the input image. Channel fusion via pointwise convolution is useful for dimensionality reduction for efficient computations. Applying 1×1×d kernels and adding an activation layer after the kernel may give a network added depth, which may increase its performance.

FIGS. 3A and 3B depicts an example of a depthwise separable convolution.

In particular, in FIG. 3A, the 12 pixel×12 pixel×3 channel input image 302 is convolved with three separate kernels 304A-C, each having a 5×5×1 dimensionality, to generate an output image 306 of 8 pixels×8 pixels×3 channels, where each channel was generated by an individual kernel amongst 304A-C.

Then output image 306 is further convolved using a pointwise convolution operation in which a kernel 308 having dimensionality 1×1×3 to generate an output image 310 of 8 pixels×8 pixels×1 channel. As is depicted in this example, output image 310 has reduced dimensionality (1 channel versus 3), which allows for more efficient computations with output image 310.

Though the result of the depthwise separable convolution in FIGS. 3A and 3B is the same as the normal convolution in FIG. 2, the number of computations is significantly less, and thus depthwise separable convolution offers a significant efficiency gain where a network design allows it.

Though not depicted in FIG. 3B, multiple (e.g., m) pointwise convolution kernels 308 (e.g., individual components of a filter) can be used to increase the channel dimensionality of the convolution output. So, for example, m=256 1×1×3 kernels 308 can be generated, which each output an 8 pixels×8 pixels×1 channel output image (e.g., 310), and these output images can be stacked to get a resulting output image of 8 pixels×8 pixels×256 channels. The resulting increase in channel dimensionality provides more parameters for training, which may improve a convolutional neural network's ability to identify features (e.g., in input image 302).

Non-Linear Activation Functions for Neural Networks

Neural network models often use non-linear activation functions, which allow the creation of complex mappings between inputs and outputs and thus allow for learning and modeling complex data, such as images, video, audio, and data sets which are non-linear or have high dimensionality. Non-linear activation functions include, for example, sigmoid or logistic functions, hyperbolic tangent (tanh) functions, rectified linear unit (ReLU), leaky ReLU (LReLU), parametric ReLU (PReLU), concatenated ReLU (CReLU), softmax, Swish, and Hard Swish, to name a few.

Non-linear activation functions in a neural network create "nonlinear" properties of the network, which beneficially enable the network to approximate and perform nonlinear y=f(x) functions. Further, non-linear activations functions are beneficial because they allow back propagation (during training) based on having a derivative function that is related to the inputs, and they allow "stacking" of multiple layers to create deep neural networks. As above, multiple hidden layers generally increase a deep neural network's ability to learn complex data sets and generate accurate inferences. Non-linear activation functions may also help normalize the output of each node of a neural network to a range between, for example [0,1] or [−1, 1].

Non-linear activation functions have conventionally limited their output to a single "phase" of activation information and suppressed or discarded other phases of activation information. For example, the ReLU activation function discards all negative pre-activations by definition. Though discarding certain activation information beneficially creates non-linearity in the model and may help constrain model complexity, it also results in a loss of information from which the model can learn to make more accurate inferences.

To demonstrate this, suppose a feature map of N channels (as in FIG. 3) is derived from a non-linear activation operation, such as ReLU. Such a non-linear activation function, a, which maps from an N dimensional space to an N dimensional space ($R^N \rightarrow R^N$), may be described for an input $X=[x_0, x_1, \ldots, x_{N-1}]$ and output $Y=[y_0, y_1, \ldots, y_{N-1}]$ as follows:

$Y=(X)$, where $y_i=x_i$, for $x_i \in [0,\infty)$, and $y_i=0$, for $x_i \in (-\infty,0)$ In other words, for all $y_i$ that are negative, the output is discarded and replaced with 0. While conventionally discarded, the negative valued y (negative activations) still include useful information for model learning. Various leading convolutional neural network models have non-linear activation functions preceding as many as 50% of their pointwise convolution layers, which means significant potential information is being discarded in conventional convolutional neural network models.

For example, a non-linear activation function such as ReLU may output positive likelihoods $x_i \in [0,\infty)$ that image data includes a particular feature (i.e., a first phase) while suppressing negative likelihoods $x_i \in (-\infty,0)$ that the image data does not include the particular feature (i.e., a second phase). The conventional single (or uni-) phase approach loses the information indicating when the particular feature is not likely to be present.

While some non-linear activation functions, such as concatenated ReLU (CReLU), can apply ReLU to both positive and negative pre-activations, a direct application of CReLU comes at the cost of doubling complexity.

Phase Selective Convolution

Phase Selective Convolutions (PSC) is an enhancement of conventional convolution methods that covers the complete activation space while preserving the ability to use non-linear activation functions, such as ReLU, and therefore preserves nonlinearity in a neural network. Specifically, in order to improve upon conventional methods, phase selective convolution selectively exploits multiple phases of activation data during convolution operations, and thereby reclaims activation information discarded by conventional non-linear activation functions. By exploiting a wider activation space, phase selective convolution results in models with improved accuracy compared to conventional methods. Moreover, phase selective convolution is able to improve accuracy without increasing computational complexity (e.g., number of multiply and accumulates (MACs)) at inference time.

Beneficially, phase selective convolution is directly applicable to convolution layers of existing convolutional neural network models without significant redesign of the existing models. In particular, applying phase selective convolution to existing models results in increased accuracy without increasing computational complexity and minimal change to model size (e.g., measured by the number of weights). Further, phase selective convolution is applicable to conventional convolutions (e.g., with kernel size K>1, as depicted in FIG. 2) as well as depthwise separable convolutions, including pointwise convolutions, such as discussed above with respect to FIGS. 3A-3B.

In order to compare phase selective convolution to conventional convolution methods, consider a baseline computational module as:

$[y_1,y_2]=[w_1,w_2] \times \text{ReLU}(x)$ $[z_1,z_2]=[y_1,y_2]+[b_1,b_2]$

This baseline computational module provides a simple model of a fully connected layer applied to a convolution.

A baseline phase selective convolution (PSC) is given by:

$[y_{11},y_{12}][w_{11},w_{12}] \times \text{ReLU}(x)$ $[y_{21},y_{22}]=[w_{21},w_{22}] \times -\text{ReLU}(-x)$ $[z_1,z_2]=[y_{11}+y_{21},y_{12}+y_{22}]+[b_1,b_2]$ The baseline PSC module above describes the PSC module during training, as it connects the input, x, to the output, z, in a differentiable manner. During inference, the PSC module can be simplified as:

$$[y_1, y_2] = [w_1, w_2] \times x$$

$$[z_1, z_2] = [y_1, y_2] + [b_1, b_2], \text{ where:}$$

$$[w_1, w_2] = \begin{cases} [w_{11}, w_{12}] & \text{if } x > 0 \\ [w_{21}, w_{22}] & \text{otherwise} \end{cases}$$

Notably, the simplified PSC module preserves the original baseline architecture by loading suitable weights $[w_1, w_2]$ depending on the sign of the input, x.

A significant benefit of the PSC module is that it acts as a "drop-in" replacement to improve performance. Even though the network architecture is modified during training, as discussed in more detail below with respect to FIG. 5B, during inference, the architecture is exactly the same as the baseline architecture. As a result, replacing an existing convolution module (e.g., layer) with a PSC module based on the existing convolution module preserves the number of MACs.

Another benefit of the PSC module is its generality. If, for example, the following conditions are set:

$w_{12}=w_{21}=0$, and $w_{22}=a \times w_{11}$, then for some scalar a, the PSC module may be simplified to the baseline computational module with the ReLU non-linear activation function replaced with a LReLU/PReLU non-linear activation function with parameter a. Thus, phase selective convolution may be flexibility adopted in many types of existing neural network architectures.

Generalized Vector Implementation of Phase Selective Convolution

Consider a matrix-vector product (e.g., a 1×1 convolution) after a ReLU activation. Denoting the weight matrix as W and the input vector as x, the output y can be expressed as:

$y=W \times \text{ReLU}(x)$.

Figure 4A:
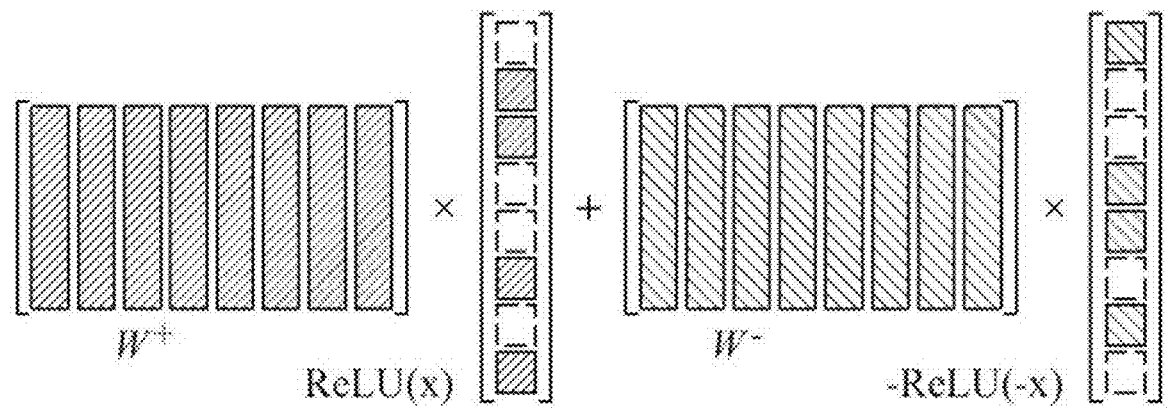
FIGS. 4A-4C depict examples of dynamic weighting based on phase selective convolutions.

As above, the ReLU operation eliminates the information in the negative pre-activations of x by treating them all the same (e.g., setting them all to zero). Phase selective convolution, by contrast, uses the negative pre-activations of the input x. To demonstrate this, let: $x^+ \triangleq \text{ReLU}(x)$ and $x^- \triangleq -\text{ReLU}(-x)$, where $\triangleq$ is a definitional operator, then the output y can be expressed as:

$y=W^+x^++W^-x^-$, where $W^+$ and $W^-$ denote the weight matrices applied to positive activations and negative activations, respectively. FIG. 4A depicts the computation graphically. In particular, the empty boxes in the ReLU vectors indicate negative activations for ReLU(x) and positive activations for −ReLU(−x).

Figure 4B:
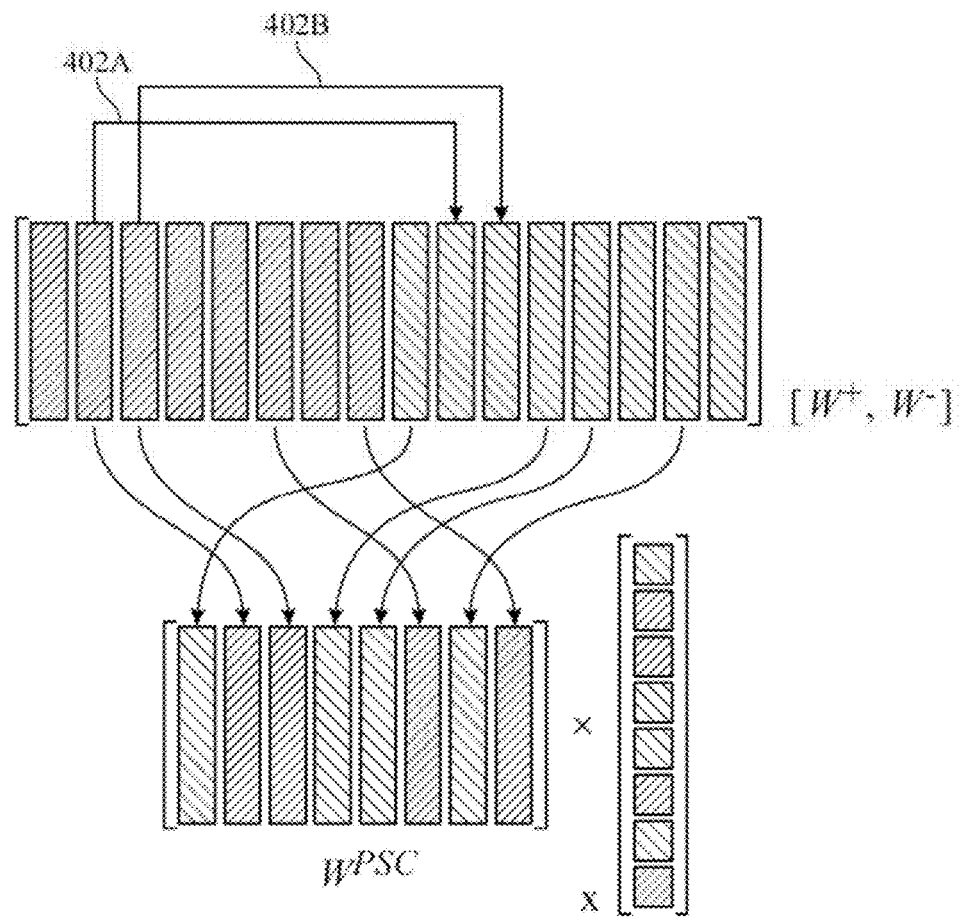

While it appears that this operation necessarily doubles both the number of parameters as well as the number of MACs, FIG. 4B depicts how the weight matrices $W^+$ and $W^-$ can be dynamically merged such that MACs are in fact the same as in the case when $x^-$ is not used. Because $x^+$ and $x^-$ complement each other, the two matrix-vector multiplications can be merged into a single one as follows:

$$y = W^+ x^+ + W^- x^- = W^{PSC} x,$$

where the columns of $W^{PSC}$ are loaded dynamically from either $W^+$ or $W^-$ according to the sign of the corresponding entry in x. Thus:

$$W_{ij}^{PSC} = \begin{cases} W_{ij}^+ & \text{if } x_j \geq 0 \\ W_{ij}^- & \text{if } x_j < 0 \end{cases}$$

The result of this formulation is the formation of a single $W^{PSC}$ that is a fusion of $W^+$ and $W^-$ while retaining the size (e.g., in terms of number of weights) of $W^+$ or $W^-$, individually.

Notably, the non-linearity of the operation $W^d x$ does not rely on applying a non-linear function on the activation of x, but rather exists through dynamic loading of the weights into a single $W^{PSC}$ based on the sign of input x. Further, the dynamic loading of $W^{PSC}$ can be made very efficient if the memory layout of $W^+$ and $W^-$ is configured such that the corresponding entries of $W^+$ and $W^-$ have a constant offset in their memory addresses, such as depicted in FIGS. 4A and 4B (e.g., offsets 402A and 402B which have a constant offset of 8). Thus, this technique of dynamic loading may be referred to as a "kernel acceleration".

Notably, FIGS. 4A and 4B illustrate the case of a matrix-vector product for phase selective convolution, which captures fully connected layers as well as 1×1 convolutions, but this scheme is generally applicable to a wide variety of linear operations, such as conventional convolutions or depthwise convolutions preceded by a non-linear activation, such as ReLU.

Figure 4C:
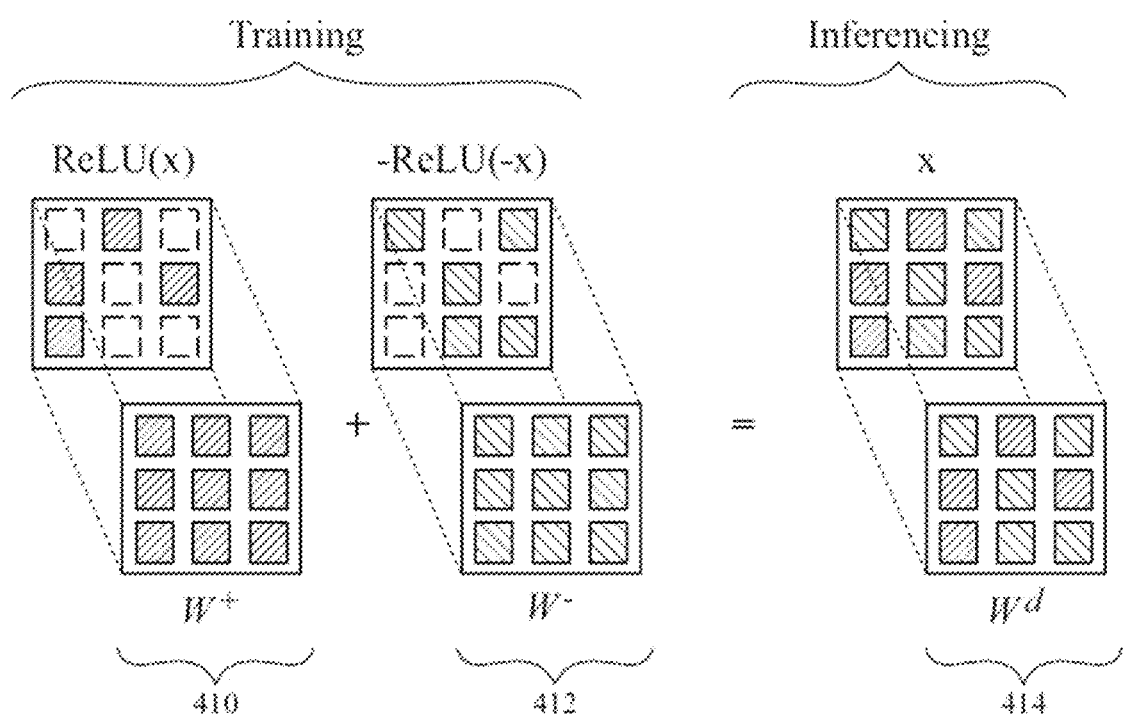

For example, FIG. 4C depicts an example of phase selective convolution on a conventional convolution with kernel K>1. In this example, a first 3×3 kernel, $W^+$ is trained on positive pre-activations at 410. In order to reclaim the negative pre-activations, a separate 3×3 kernel, $W^-$, is trained on negative pre-activations at 412. Then, at inference time, the two convolutions are effectively consolidated by loading weight entries, according to sign(x), from $W^+$ and $W^-$ into a dynamic kernel $W^{PSC}$ for the phase selective convolution. Thus, as depicted at 414, no additional MACs are necessary compared to 410.

Optimization of Synthesized Phase Selective Convolution Kernels Using Singular Value Decomposition One method of determining an optimal synthesis of $Conv^+$ and $Conv^-$ is to perform a singular value decomposition (SVD) analysis of the $Conv^+$ and $Conv^-$ kernels after training, such as described above with respect to FIG. 4B. An optimal synthesis of multi-phase convolution kernels beneficially improves model performance (e.g., improved accuracy).

Initially, the multi-phase convolution dimensionalities are such that:

$$Conv^+: R^N \to M^+, \text{ and}$$

$$Conv^-: R^N \to M^-,$$

where $M^+ + M^- = M$.

Notably, because $M^+ + M^- = M$, the overall dimensional complexity is not increased by phase selective convolution, which preserves the complexity of the original single phase model.

The quantities of $M^+$ and $M^-$ may be determined by selecting the top M most significant components of the phase selective convolution kernels (e.g., weight matrices) associated with $Conv^+$ and $Conv^-$ by performing singular value decomposition. For example:

$$Conv^+ = U^+ \Sigma^+ V^+, \text{ and}$$

$$Conv^- = U^- \Sigma^- V^-.$$

In the above expressions, $U^+$, $U^-$, $V^+$, and $U^-$ are unitary square matrices with orthonormal columns or rows, and $\Sigma^+$ and $\Sigma^-$ are diagonal matrices with non-negative entries. After performing singular value decompositions on $Conv^+$ and $Conv^-$, column or row vectors are selected from the unitary matrices based on the top M singular values from $\Sigma^+$ and $\Sigma^-$.

For example, the singular value decomposition may be determined as follows:

$$\Sigma^+ = \begin{bmatrix} \sigma^+ & 0 \\ 0 & 0 \end{bmatrix} \text{ and } \Sigma^+ = \begin{bmatrix} \sigma^- & 0 \\ 0 & 0 \end{bmatrix}, \text{ where}$$

$$I^+ \in R^{M^+},$$

$$I^- \in R^{M^-},$$

$$M^+ + M^- = M.$$

Further, U and V may be partitioned by zeroing unnecessary submatrices, so that:

$$U^+ = [u^+ \quad 0] \text{ and } U^- = [u^- \quad 0], \text{ and}$$

$$V^+ = \begin{bmatrix} v^+ \\ 0 \end{bmatrix} \text{ and } V^- = \begin{bmatrix} v^- \\ 0 \end{bmatrix}.$$

Effective U, $\Sigma$, and V matrices may then be synthesized as follows:

$$U = [u^+ \quad u^-],$$

$$\Sigma = \begin{bmatrix} \sigma^+ & 0 \\ 0 & \sigma^- \end{bmatrix}, \text{ and}$$

$$V = \begin{bmatrix} v^+ \\ v^- \end{bmatrix}.$$

To make dimensioning of the multi-phase phase selective convolution weight matrix $W_{PSC}$ equivalent to that of the original single-phase weight matrix, the phase selective convolution weight matrix may be derived as:

$$W_{PSC} = U \Sigma V = U^+ \Sigma^+ V^+ + U^- \Sigma^- V^-.$$

However, note that $\Sigma^+$ and $\Sigma^-$ are both diagonal matrices, implying that these weights may be "absorbed" (either leftwards towards U or right-wards toward V) during synthesis. Thus:

$$U = [\, u^+ \;\; u^- \,], \text{ and}$$

$$\Sigma V = \begin{bmatrix} \sigma^+ & v^+ \\ \sigma^- & \sigma^- \end{bmatrix}, \text{ where}$$

$$U^+ \in R^{M \times M^+}, U^- \in R^{M \times M^-}, \Sigma^+ V^+ \in R^{M^+ \times N}, \text{ and}$$

$$\Sigma^- V^- \in R^{M^- \times N}.$$

Thus, the following final expression can be derived:

$$W_{PSC} = U\Sigma V = U^+(\Sigma^+ V^+) + U^-(\Sigma^- V^-).$$

In the above expression, $W_{PSC}$ refers to an optimal kernel of "synthesized" results derived from $Conv^+$ and $Conv^-$. Thus, during inference time, output of a model trained using phase selective convolution may be calculated (generally) as $Y = W_{PSC}X$.

The significance of this final expression is that two matrix multiplications are not necessary for this three-factor form given that the $\Sigma$ matrices are diagonal (e.g., only diagonal terms are non-zero). Thus, this final expression emphasizes that $\Sigma$ matrices can be absorbed into the V matrices and only one matrix multiplication between U and $\Sigma V$ is needed for either phase.

Thus, the SVD analysis allows for synthesizing $Conv^+$ and $Conv^-$ by selecting the top M (sorted) singular values and their associated U and V vectors. The origin (being positive or negative) of those selected singular values also gives the p ratio as a byproduct, and because it is an optimal ratio based on the top singular values, the SVD analysis also results in a determination of $\rho_i^{opt}$.

Notably, in some embodiments, after $W_{PSC}$ synthesis, an additional "fine tuning" of the model weights may be performed by loading the synthesized $W_{PSC}$ and training the model with suitable hyperparameters, such as relatively smaller learning rates. This fine tuning step allows for "touching up" the weights for optimality. Thus, the fine tuning is different from the initial training in that the initial training typically uses random weight initialization.

Weight Initialization for Phase Selective Convolution

While networks with a phase selective convolution module can be trained from randomly initialized weights, similar to other CNN models, random initialization does not always give the best possible accuracy. However, if a legacy network already exists with trained weights, then a corresponding PSC-enhanced network (e.g., with one or more PSC modules) can use the legacy weights for initialization. The benefit of the legacy network-based weight initialization is that the enhanced network will, upon initialization, have at least as good as performance as the legacy network, which may then be further improved by an optimization techniques, such as gradient descent, which can take further advantage of the PSC enhanced network architecture.

For example, consider a convolutional neural network (CNN) with trained weights, wherein the trained weights of a certain layer are represented by a matrix $W^*$. $W^+$ and $W^-$ can then be initialized in a corresponding PSC module as follows:

$$W^+ = W^*, W^- = 0.$$

With this initialization, the CNN enhanced with one or more PSC modules, at least initially, computes exactly the same function as the CNN without the PSC modules.

However, applying random initialization for both $W^+$ and $W^-$ has shown to give even better performance. For example, one initialization method is given by:

$$W^+ = W^- = W^*,$$

where $W^*$ is the weight of the same layer in the CNN without the PSC module. This method may be referred to as "linear initialization" since if the values of $W^+$ and $W^-$ are inserted into $y = W^+x^+ + W^-x^-$, then the resulting expression is: $y = W^*(x^+ + x^-) = W^*x$. In other words, a layer enhanced with a PSC module with weights initiated in this manner is initially equivalent to a linear layer.

When initializing a network with multiple PSC modules (e.g., N PSC modules), even better empirical performance is possible by initializing the network's weights with those of a corresponding network with N−1 PSC modules, rather than the weights of a corresponding network with no PSC modules. This method may thus be referred to as "iterative linear initialization."

Note that in the iterative case, training the network with N PSC modules takes significantly less time than training N networks from random initialization because the network with N PSC modules is initialized with the weights of the network with N−1 PSC modules, which already has very good performance.

Notably, the iterative linear initialization method is only necessary to obtain the highest possible performance. When performance requirements are more flexible, a random initialization may still generate good performance for a particular use case or context.

Phase Selective Convolution for Depthwise Separable Convolutions

Generally For depthwise separable convolutions with kernel size K and total channels C, the convolution operation may be expressed as:

$$Y = \mathbb{O}_c \{\Sigma_k w_{c,k} x_{c,k}\},$$

where $w_{c,k}$ represent the weights (of kernel size K) and $x_{c,k}$ represents the activations, each for a channel $c \in C$ and kernel entry index k. In the above expression, the "$\mathbb{O}_c$" operator represents concatenation for channel $c \in C$ along the channel dimension.

If a depthwise separable convolution is immediately preceded by a non-linear activation function, such as ReLU, the phase selective convolution may instead be expressed as:

$$Y = \mathbb{O}_c \{\Sigma_k w_{c,k} x_{c,k}^+\}.$$

In the above expression, the "+" superscript stands for the selection of positive entries (e.g., positive pre-activations) out of the $X_c$ tensors prior to the non-linear activation function. Negative entries (e.g., negative pre-activations) are unselected or discarded from $X_c$ and replaced with zeroes.

Thus, phase selective convolution for a depthwise separable convolution layer may be performed according to the following generalized operations: (1) separating and selecting between the positive and negative entries of pre-activations $X_c$; (2) learning separate weights for both positive and negative activations during training; (3) and dynamically synthesizing a weight matrix depending on the phases (e.g., signs) of pre-activation entries during inferencing.

For a depthwise separable convolution layer that immediately follows a non-linear activation function (typically, a ReLU) the non-linear activation function and the conventional convolution layer may be replaced with a phase selective convolution layer (or module). In this way, the phase selective convolution layer takes signed activations as input with no dimensioning change. The motivation for modifying the existing separable convolution layer in this manner is that it allows the network to automatically learn (through backpropagation and optimization with the loss function and gradients) the weights for both phases of activations (e.g., positive and negative) during training for each depthwise separable convolution layer. An example of a modified architecture is described in more detail below with respect to FIG. 5B.

Thus, a phase selective convolution method for an existing depthwise separable convolution may be expressed as:

$$Y = \bigodot_c \{\Sigma_k w_{c,k}^+ x_{c,k}^+ + w_{c,k}^- x_{c,k}^-\}.$$

In the preceding expression, $w_{c,k}^+$ and $w_{c,k}^-$ represent the weights associated with positive and negative activations, respectively, for channel $c \in C$. Further, $x_{c,k}^+$ and $x_{c,k}^-$ represent the positive and negative entries, respectively, of activation X.

Training the phase selective depthwise separable convolution layer depends on the signs of activations. Thus, $w_{c,k}^+$ is trained on the positive subset of activations and the other activations are discarded (e.g., zeroed out). Similarly, $w_{c,k}^-$ is trained on the negative subset of activations and the other activations are discarded. At the end of training, there are two sets of weights, $W_C^+$ and $W_C^-$ for each channel $c \in C$ and for each phase selective convolution layer.

Accelerated Inferencing of Depthwise Separable Phase Selective Convolutions Using Dynamic Weight Selection For any corresponding entry pair ($w_{c,k}$, $x_{c,k}$) with kernel entry index $k \in \{0, 1, \ldots, K-1\}$ of channel $c \in C$, the entry of activation $x_{c,k} \in R$ is either positive or negative. Note that $x_{c,k} = 0$ can arbitrarily be defined belonging to the positive set. Consequently, there can be at most one non-zero term out of the two terms $w_{c,k}^+ x_{c,k}^+$ and $w_{c,k}^- x_{c,k}^-$ for any given c and k. In other words, there is no need to compute both the terms of $w_{c,k}^+ x_{c,k}^+$ and $w_{c,k}^- x_{c,k}^-$ and then sum up over k's for each channel $c \in C$.

Instead, to accelerate the design, only one computation per channel is needed for inferencing. To this end, a "weight selector" mechanism may be implemented with W as the phase selective convolution accelerator such that:

$$Y = \bigodot_c \{\Sigma_k (w_{c,k}^+ x_{c,k}^+ + w_{c,k}^- x_{c,k}^-)\} = \bigodot_c \{\Sigma_k (W_{c,k}(x_{c,k}) x_{c,k}^+ + W_{c,k}(x_{c,k}) x_{c,k}^-)\} = \bigodot_c \{\Sigma_k (W_{c,k}(x_{c,k}) x_{c,k})\}.$$

In the above expression, $W_{c,k}(x)$ is a function of x that satisfies:

$$W_{c,k}(x) = W_{c,k}^+, \text{ if } x \geq 0, \text{ and}$$

$$W_{c,k}(x) = W_{c,k}^-, \text{ if } x < 0.$$

With the "weight selection" or "weight loading" based on the activation signs, the computational complexity of depthwise separable phase selective convolution is reduced to the number of MACs as conventional depthwise separable convolution despite taking advantage of the additional information in the negative activations.

Notably, phase selective convolution is an individual layer operation. As such, phase selective convolution can arbitrarily or strategically be selected for a subset of depthwise separable convolution layers by design choice.

Phase Selective Convolution for Pointwise Convolutions

Conventional pointwise convolution layers can likewise enhanced using phase selective convolution. Although the concept and motivation are similar to the depthwise separable convolution use case, the operation details are different.

Initially, a pointwise convolution operation may be expressed as:

$$Y = WX,$$

where $W \in R^{M \times N}$ is the weight matrix, $X \in R^N$ is input activation, and $Y \in R^M$ is the output activation. For a pointwise convolution layer that immediately follows a non-linear activation function (e.g., ReLU), the expression can be modified as:

$$Y = WX^+,$$

where the "+" superscript stands for the selection of positive entries out of the X, tensors prior to the non-linear activation function. As above, the negative entries are discarded from X, (e.g., replaced with zeroes).

Thus, similar to the case of depthwise separable convolution, phase selective convolution for a pointwise convolution layer may be performed according to the following generalized operations: (1) separating and selecting between the positive and negative entries of activation X; (2) learning separate weights for the positive and the negative activations during training; and (3) weighting depending on the phases (e.g., signs) of associated activation entries during inferencing.

For a pointwise convolution layer that immediately follows a non-linear activation function (typically, a ReLU), the non-linear activation function and the conventional convolution layer may be replaced with a phase selective convolution layer (or module). In this way, as above, the phase selective convolution layer takes signed activations as input with no dimensioning change. Thus, the existing pointwise convolution layer may automatically learn (through backpropagation and optimization with the loss function and gradients) the weights for both sets of activations (e.g., positive and negative) during training for each depthwise separable convolution layer.

Thus, a phase selective convolution method for pointwise convolution may be expressed as:

$$Y = W^+ X^+ + W^- X^-,$$

where, $W^+$ and $W^-$ represent the weights associated with positive and negative activations, respectively, and $X^+$ and $X^-$ represent the positive and negative activations, respectively, of multi-phase activation X.

As above, training the phase selective pointwise convolution layer depends on the signs of activations X. Specifically, for $W^+$, the positive subset of activations are used and the negative subset of activations are discarded, e.g., by being zeroed out, prior to training $W^+$. For $W^-$, the negative subset of activations are used and the positive subset of activations are discarded, e.g., by being zeroed out, priori to training $W^-$. At the end of training, there are two sets of trained weights, $W^+$ and $W^-$, for each phase selective pointwise convolution layer.

Accelerated Inferencing of Pointwise Phase Selective Convolutions Using Dynamic Weight Selection For any corresponding entry pair ($w_c$, $x_c$) of input channel $c \in C$, the entry of activation $x_c \in R$ is either positive or negative. Note that $x_c = 0$ can arbitrarily be defined as belonging to the positive set. Consequently, there can be at most one non-zero term out of $w_c^+ x_c^+$ and $w_c^- x_c^-$. Thus, as above, there is no need to compute both $w_c^+ x_c^+$ and $w_c^- x_c^-$ and then sum up for each input channel $c \in C$.

Instead, to accelerate the design, only one computation per channel is needed for inferencing. Specifically, a "weight selector" mechanism may be implemented for W as the phase selective convolution accelerator such that:

$$Y = W^+ X^+ + W^- X^- = W(X)X^+ + W(X)X^- = W(X)X.$$

In the above expression, W(x) is a function of x that satisfies:

$W(x_c) = w_c^+$, if $x_c \geq 0$ for input channel $c \in C$, and $W(x_c) = w_c^-$, if $x_c < 0$ for input channel $c \in C$.

With the "weight selection" or "weight loading" based on the activation signs, the computation complexity of pointwise convolution is reduced to same number of multiplications as the conventional pointwise convolution.

Notably, phase selective convolution is an individual layer operation. As such, phase selective convolution can arbitrarily or strategically be selected for a subset of pointwise convolution layers by design choice.

Modifying a Network Architecture for Phase Selective Convolution During Training In order to implement phase selective convolution (PSC) during model training time, a network architecture may be modified by splitting one or more processing layers into multiple phase-specific branches. For example, branches may be created for positive activation data and for negative activation data.

Figure 5A:
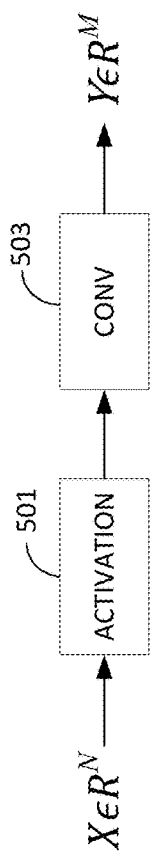
FIGS. 5A and 5B depict example convolution architectures.

For example, FIG. 5A depicts a processing architecture in which an activation function 501 is followed by a convolution operation 503, such as may be found in architectures such as ResNet. In this example, activation function 501 is a non-linear activation function, ReLU, but in other examples, other suitable activation function could be used.

Figure 5B:
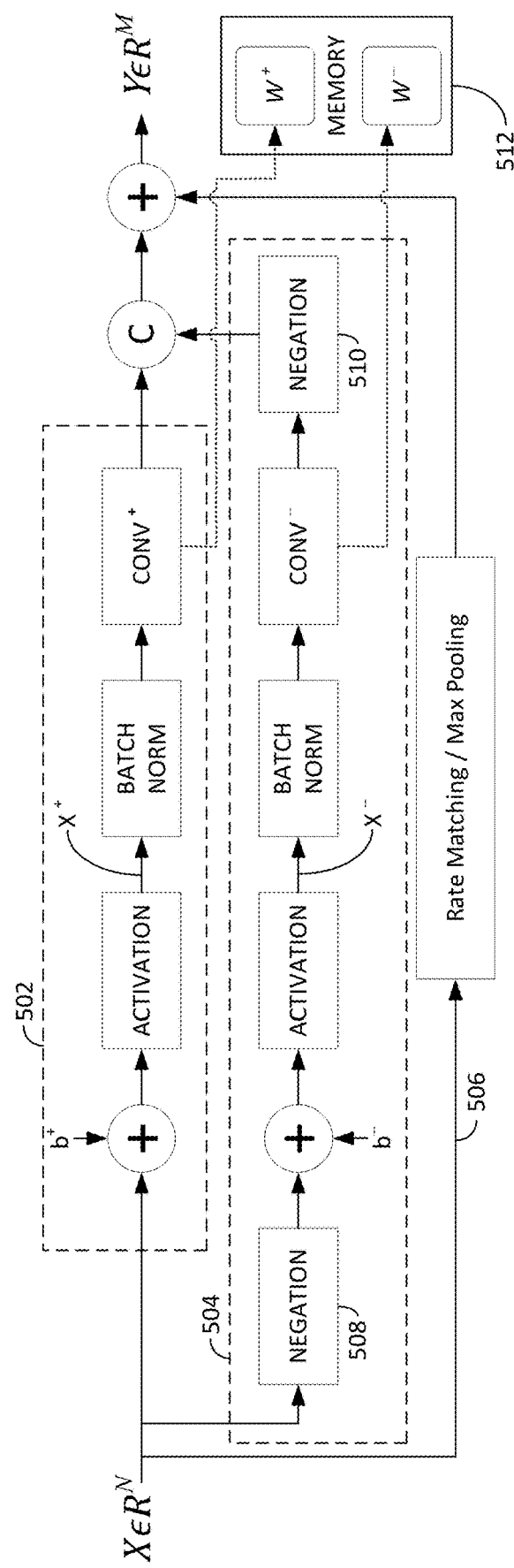

FIG. 5B depicts a modified architecture based on the overall operation of FIG. 5A in which phase selective convolution is implemented. In particular, the single processing "branch" of FIG. 5A is split into two processing branches, 502 and 504 in FIG. 5B, each of which corresponds to a separate path for a separate "phase" of activation information. In this example, positive pre-activation data (or positive pre-activations) are processed on "positive branch" 502 and negative pre-activation data (or negative pre-activations) are processed on "negative branch" 504. Here, "positive" and "negative" refer to different phases of information. In other examples, other phase definitions and more phases may be used.

In FIG. 5B, processing of positive branch 502 begins with adding a learnable bias (or offset) $b^+$ to the positive pre-activation input data (or positive pre-activations) before the activation function. In this example, the activation function is ReLU, but other activation functions may be used in other examples. The activation function outputs positive activation output data (or positive activations), which are denoted by $X^+$.

Further in this example, the positive activations $X^+$ are processed by a batch normalization before a convolution operation.

Batch normalization generally provides inputs that are zero mean and unit variance by adjusting and scaling the inputs. This generally improves the learning rate, layer independence, and reduces overfit. In some examples, batch normalization normalizes the output of a previous activation layer by subtracting the batch mean and dividing by the batch standard deviation. However, after the adjusting and scaling of activation outputs by some randomly initialized parameters, the weights in the next layer may no longer be optimal. For example, stochastic gradient descent may undo the normalization if it minimizes a loss function. Consequently, batch normalization generally adds trainable parameters to each layer. For example, the normalized output may be multiplied by a "standard deviation" parameter (gamma) and add a "mean" parameter (beta), which allows stochastic gradient descent to perform denormalization by changing only these trainable parameters for each activation, instead of losing the stability of the network by changing all the weights.

After batch normalization of the positive activations $X^+$ in positive branch 502, the branch normalized positive activations are input to a convolution operation denoted by Conv$^+$ in positive branch 502. The Conv$^+$ convolution operation has an associated positive convolution kernel that is trainable.

The output of the positive convolution (Conv$^+$) in positive branch 502 is a positive branch feature map.

Processing of negative branch 504 begins with a negation operation 508, which changes the sign of the negative pre-activation input data (or negative pre-activations). Negation operation 508 is necessary so that the non-linear activation (ReLU) will not discard the negative pre-activations in negative branch 504.

After negation operation 508, another learnable bias $b^-$ is added to the negative pre-activations before the activation function in negative branch 504. In this example, the activation function is again ReLU, but in other examples, the positive and negative branches may use different activation functions.

The activation function in negative branch 504 then outputs negative activation output data (or negative activations), which are denoted by $X^-$. The negative activations $X^-$ are then processed by a batch normalization before a convolution operation, which is denoted by Conv$^-$ in negative branch 504.

After batch normalization in negative branch 504, the branch normalized negative activations are input to a convolution operation denoted by Conv$^-$ in negative branch 504. The Conv$^-$ convolution operation has an associated negative convolution kernel that has been trained on negative branch activation data, and thus may be different from the positive convolution kernel used by Conv$^+$ in positive branch 502.

Another negation operation 510 is applied to the output of Conv$^-$ (e.g., a negative branch feature map), which restores the "phase" of the convolutional output to negative so that it has the appropriate effect on the overall output.

In this example, the resulting feature maps from Conv$^+$ and Conv$^-$ are fused together with a concatenation operation (©) along the channel dimension between the positive branch feature map and the negative branch feature map. However, in other examples, a different operation, such as an element-wise summation ⊕ could be used instead.

Generally speaking, concatenation may be more precise, as output features from either branch (e.g., Conv$^+$ and Conv$^-$) remain separated and subsequent weighting can more optimally weight on the separated activations. However, there is a cost to pay for concatenation operations because each output activation needs a buffer space and a corresponding weight to multiply. Summation may have a lower cost because element-wise summation reduces the total output activations by half and therefore the buffer cost and multiplication costs are also halved. But summation may not be as optimal in terms or accuracy as concatenation. In fact, summation may be regarded as one special case of concatenation wherein the corresponding activations (of the same index) from both branches share the same weights in the concatenation case; in other words, an equal-weight summation in the concatenation special case.

Further in this example, a skip connection 506 is used. Skip connections are generally connections that skip one or more layers and may thus also be referred to as "short cut" connections. A motivation for skipping over layers is to simplify the network, using fewer layers in the initial training stages. This speeds learning by reducing the impact of vanishing gradients, as there are fewer layers to propagate through. The network then gradually restores the skipped layers as it learns the feature space. Notably, skip connections need not be added in other embodiments.

When, as in this example, a skip connection is used, the final step in processing the layer is to perform an element-wise summation ⊕ between the combined output from Conv⁺ and Conv⁻ and the original input information X.

In some examples, skip connection 506 may be "rate matched" to deal with different shapes or lengths between tensors N and M. For example, if N=M, then a simple element-wise addition can be applied between N and M. If N<M, then the N sequence may be repeated and then summed element-wise with M along the channel dimension, and the final repetition may be fractional. Further, if N>M, then the N sequence may be wrapped around the size M for a number of times and then be summed element-wise along the channel dimension. Alternatively, a max pooling operation can serve to transition the tensor from size M to size N.

In this example, the trained kernels for Conv⁺ and Conv⁻, W⁺ and W⁻, respectively, are stored in memory 512 for later use during inferencing. In particular, these positive and negative kernels may later be used to dynamically generate a phase selective convolution kernel, $W^{PSC}$, for inferencing.

The positive and negative branch learnable biases (b⁺ and b⁻) in the example of FIG. 5B are optional vectors of a size of one scalar per channel. Including optional branch-specific biases may beneficially relax the design constraint by allowing the individual branches of the network to adapt (through learning) to optimum non-zero biases for each branch. Without such biases, the input activations need to be strictly (i.e., not as relaxed) partitioned into two sets, one for each branch, not allowing any gap or overlapping regions between the two (partitioned) input activation sets. When used, b⁺ and b⁻ may initially be set at 0 as default values, and then be trained with other parameters at training time.

Further, the batch normalization operations in this example are also optional and may be omitted in other examples. As an optional alternative to batch normalization, additional biases may be added (not shown). Generally, including either batch normalization or biases allows relaxation in statistics characteristics of activations through re-parameterization. For example, including a bias allows the mean of an activation distribution to change (through learning), and including a batch normalization allows both a mean and a variance of an activation distribution to change.

Figure 6A:
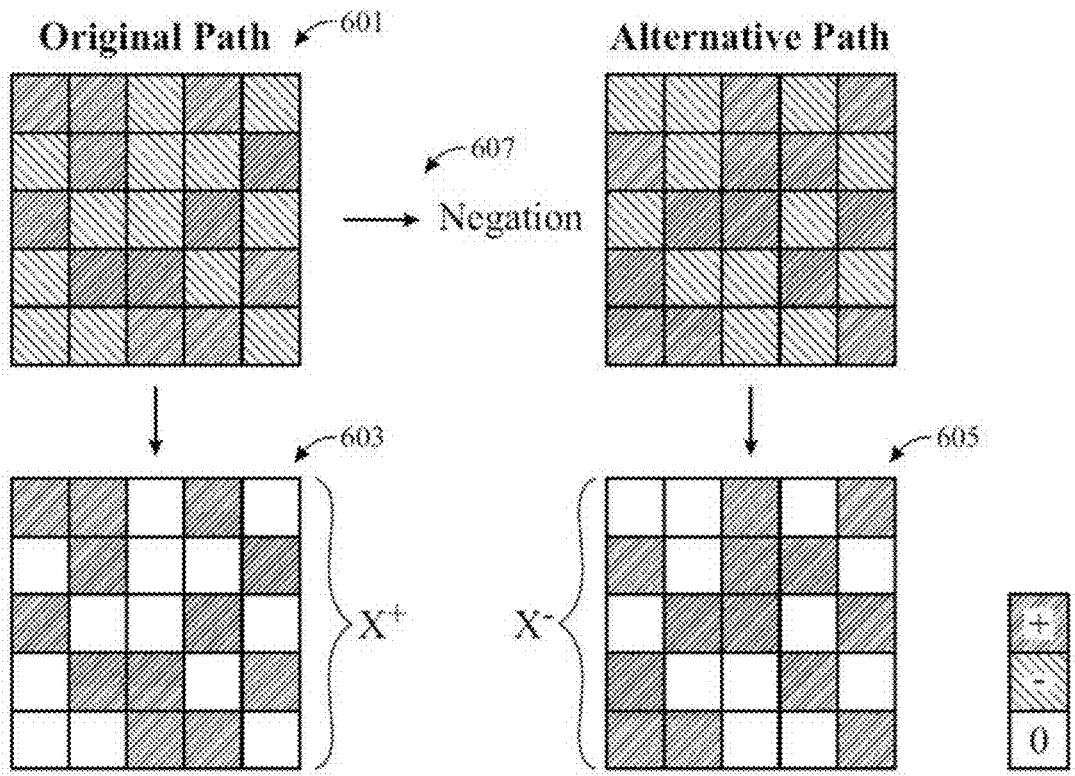
FIGS. 6A and 6B depict aspects of phase selective convolution.

FIG. 6A depicts a graphical example of splitting multi-phase pre-activation data 601 (e.g., positive and negative pre-activations) into two subsets of activation data, including positive activations (X⁺) 603 and negative activations (X⁻) 605. Just as shown in FIG. 5B, here the negative activations (X⁻) 605 are generated through an initial negation 607 followed by a non-linear activation function (not depicted) to generate the decomposed phases of positive and negative activation data, 603 and 605, respectively.

Figure 6B:
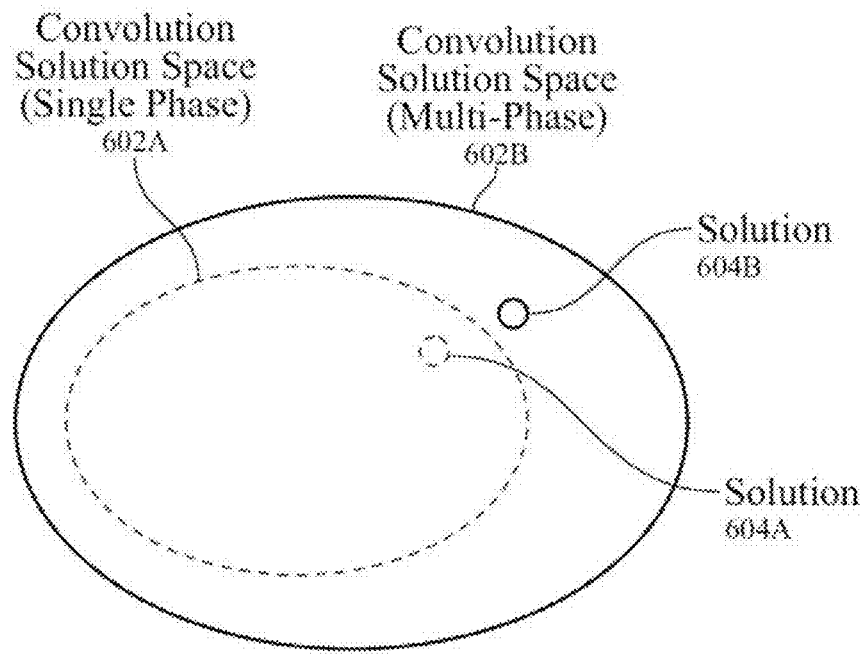

Thus, the phase selective convolution architecture in FIG. 5B effectively expands the solution space by allowing both activations associated with positive and negative subsets of the solution space to be considered during training. This benefit is graphically depicted in FIG. 6B, which shows a multi-phase convolution solution space 602B that is larger than a corresponding single phase convolution solution space, 602A. For example, single phase convolution solution space 602A may correspond to the solution space using just positive activations (X⁺) 603 in FIG. 6A, and multi-phase convolution solution space 602B may correspond to the solution space using the positive activations (X⁺) 603 and negative activations (X⁻) 605 in FIG. 6A. Thus, a better solution 604B is achievable as compared to the optimal solution 604A in the single-phase solution space.

Example Methods of Phase Selective Convolution

Figure 7A:
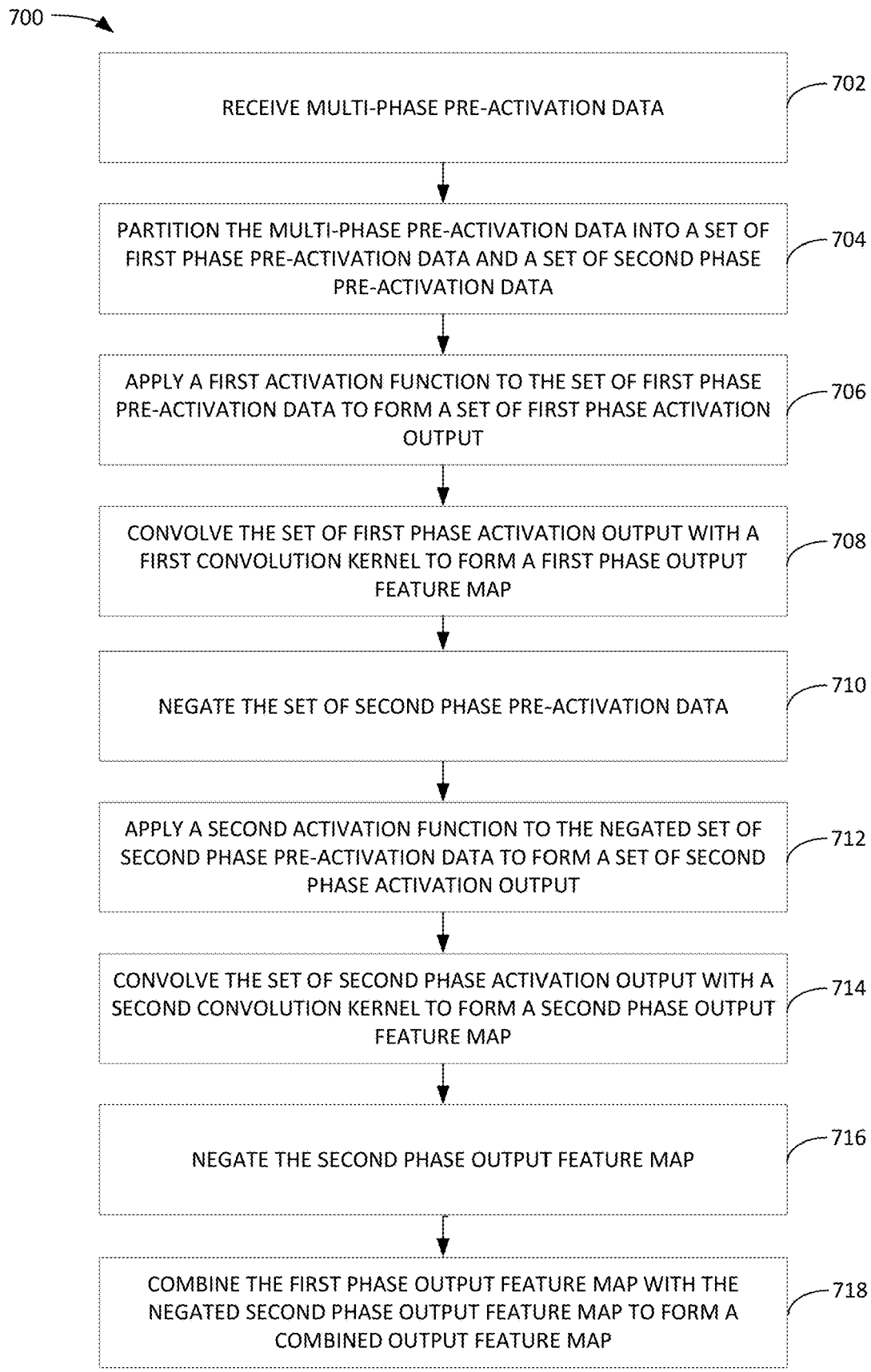
FIG. 7A depicts an example method of training a phase selective convolution layer.

FIG. 7A depicts an example method 700 of performing phase selective convolution. For example, method 700 may be used when training a neural network including one or more phase selective convolution layers (or modules).

Method 700 begins at step 702 with receiving multi-phase pre-activation data, for example, as depicted in FIG. 5B.

Method 700 then proceeds to step 704 with partitioning the multi-phase pre-activation data into a set of first phase pre-activation data and a set of second phase pre-activation data, for example, as depicted in FIG. 5B.

Method 700 then proceeds to step 706 with applying a first activation function to the set of first phase pre-activation data to form a set of first phase activation output, for example, as depicted in FIG. 5B.

Method 700 then proceeds to step 708 with convolving the set of first phase activation output with a first convolution kernel to form a first phase output feature map, for example, as depicted in FIG. 5B. The first convolution kernel corresponds to W⁺, as described above.

Method 700 then proceeds to step 710 with negating the set of second phase pre-activation data, for example, as depicted in FIG. 5B. In some embodiments, negating may be accomplished via additively inverting the second phase pre-activation data, such as by an additive inverse function.

Method 700 then proceeds to step 712 with applying a second activation function to the negated set of second phase pre-activation data to form a set of second phase activation output, for example, as depicted in FIG. 5B.

Method 700 then proceeds to step 714 with convolving the set of second phase activation output with a second convolution kernel to form a second phase output feature map, for example, as depicted in FIG. 5B. The second convolution kernel corresponds to W⁻, as described above.

Method 700 then proceeds to step 716 with negating the second phase output feature map, for example, as depicted in FIG. 5B at 508.

Method 700 then proceeds to step 718 with combining the first phase output feature map with the negated second phase output feature map to form a combined output feature map.

In some embodiments, method 700 further includes training the neural network based on the first phase output feature map and the second phase output feature map.

In some embodiments of method 700, the first convolution kernel and the second convolution kernel comprise the different weight matrices. As described above, these different weight matrices may be dynamically combined at inference time to form a phase selective convolution kernel, $W^{PSC}$.

Some embodiments of method 700 further include: adding a first phase bias (e.g., $b^+$ in FIG. 5B) to the set of first phase pre-activation data; and adding a second phase bias (e.g., $b^-$ in FIG. 5B) to the set of second phase pre-activation data, for example, as depicted in FIG. 5B.

Some embodiments of method 700 further include: performing a first batch normalization on the first phase activation output (e.g., $X^+$ in FIG. 5B); and performing a second batch normalization on the second phase activation output (e.g., $X^-$ in FIG. 5B), for example, as depicted in FIG. 5B.

In some embodiments of method 700, the first activation function is a ReLU function, and the second activation function is a ReLU function.

Figure 7B:
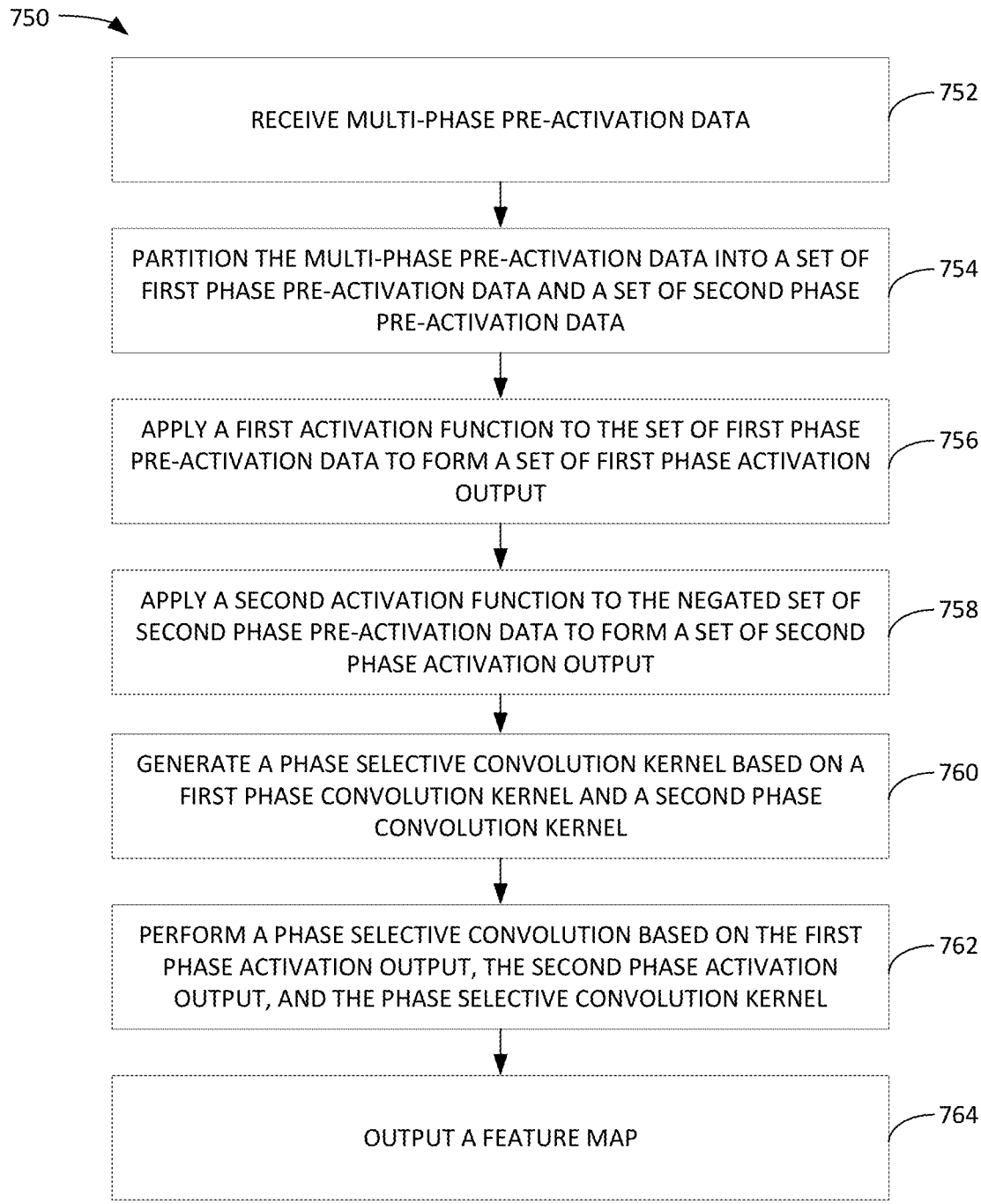
FIG. 7B depicts an example method of inferencing based on a dynamic phase selective convolution kernel.

FIG. 7B depicts an example method 750 of inferencing with a neural network comprising a phase selective convolution layer.

Method 750 begins at step 752 with receiving multi-phase pre-activation data.

Method 750 then proceeds to step 754 with partitioning the multi-phase pre-activation data into a set of first phase pre-activation data and a set of second phase pre-activation data.

Method 750 then proceeds to step 756 with applying a first activation function to the set of first phase pre-activation data to form a set of first phase activation output.

Method 750 then proceeds to step 758 with applying a second activation function to the negated set of second phase pre-activation data to form a set of second phase activation output.

Method 750 then proceeds to step 760 with generating a phase selective convolution kernel based on a first phase convolution kernel and a second phase convolution kernel.

Method 750 then proceeds to step 762 with performing a phase selective convolution based on the first phase activation output, the second phase activation output, and the phase selective convolution kernel.

Method 750 then proceeds to step 764 with outputting a feature map.

In some embodiments of method 750, generating the phase selective convolution kernel comprises: loading from a memory the first phase convolution kernel; loading from the memory the second phase convolution kernel; for each respective element in the phase selective convolution kernel: determining a sign of a corresponding activation in the first phase activation output; determining a sign of a corresponding activation in the second phase activation output; loading into the respective element in the phase selective convolution kernel a value corresponding to a corresponding element in the first phase convolution kernel if the sign of the corresponding activation in the first phase activation output is greater than 0; and loading into the respective element in the phase selective convolution kernel a value corresponding to a corresponding element in the second phase convolution kernel if the sign of the corresponding activation in the second phase activation output is >0. For example, dynamically loading a phase selective convolution kernel is depicted in FIGS. 4B and 4C.

In some embodiments of method 750, the first phase convolution kernel and the second phase convolution kernel comprise different weight matrices.

In some embodiments of method 750, the first activation function is a ReLU function, and the second activation function is a ReLU function.

Example Advantages of Phase Selective Convolution

As described herein, phase selective convolution offers many advantages over conventional convolution techniques.

First, phase selective convolution results in higher accuracy than conventional convolution techniques without increasing the number of MACs for inferencing. Moreover, because phase selective convolution may be applied in selected layers, the model size (number of weights) increase may be controlled and remain relatively small, while gaining disproportionally larger accuracy gains.

Second, phase selective convolution is broadly applicable to uses cases involving a convolutional neural network model, such as image/video classification, object detection, segmentation, human pose estimation, recognition/identification, and others. In particular, as described above, phase selective convolution improves the performance for both types of depthwise separable convolution and for pointwise convolution, and is likewise applicable to standard (non-depthwise separable) convolutions.

Third, unlike conventional model compression, phase selective convolution requires no two or three-stage training and offline model analysis plus re-training. Relatedly, phase selective convolution does not require use of trainable channel wiring (discovering neural wiring (DNW)), which generally results in slower training time and larger resource requirements.

Fourth, phase selective convolution is guaranteed to have a larger solution space (that covers the complete activation space) as compared to conventional techniques that discard certain phases of activation data, such as negative activations. Further, any optimum learnable by conventional convolution methods is likewise learnable by phase selective convolution.

Fifth, phase selective convolution automatically learns the optimal way to partition and handle positive and negative activations, which means there is no need to heuristically place or remove non-linear activation functions (e.g., ReLU) at a subset of layers, such as in all/most of the popular/off-the-shelf CNN models.

Sixth, convolution layers to be replaced by phase selective convolution layers (or modules) can be arbitrarily chosen and there is consequently no need to do a whole model convolution layer replacement.

Seventh, although the number of model weights are larger for a phase selective convolution layer compared to a corresponding baseline convolution layer, for models that are loadable from ROM or cheaper memories for iteration-to-iteration playout, phase selective convolution costs minimal additional memory storage. This is especially true in cases such as smartphone applications (where memory/storage for applications is abundant), cloud/server artificial intelligence services, and device applications for which supplemental/external memory or storage is available. In fact, there is yet another advantage I did not add in the IDF slides but later experiments confirmed as an advantage of DPSC. That is, DPSC may be applied in selected layers so that the model size (number of weights) increase is negligibly small, yet the accuracy gains are significant.

Notably, the aforementioned are only a selected set of the technical advantages of phase selective convolution over conventional convolution methods, and others will be readily apparent to those of skill in the art.

Example Processing Systems for Performing Phase Selective Convolution

Figure 8:
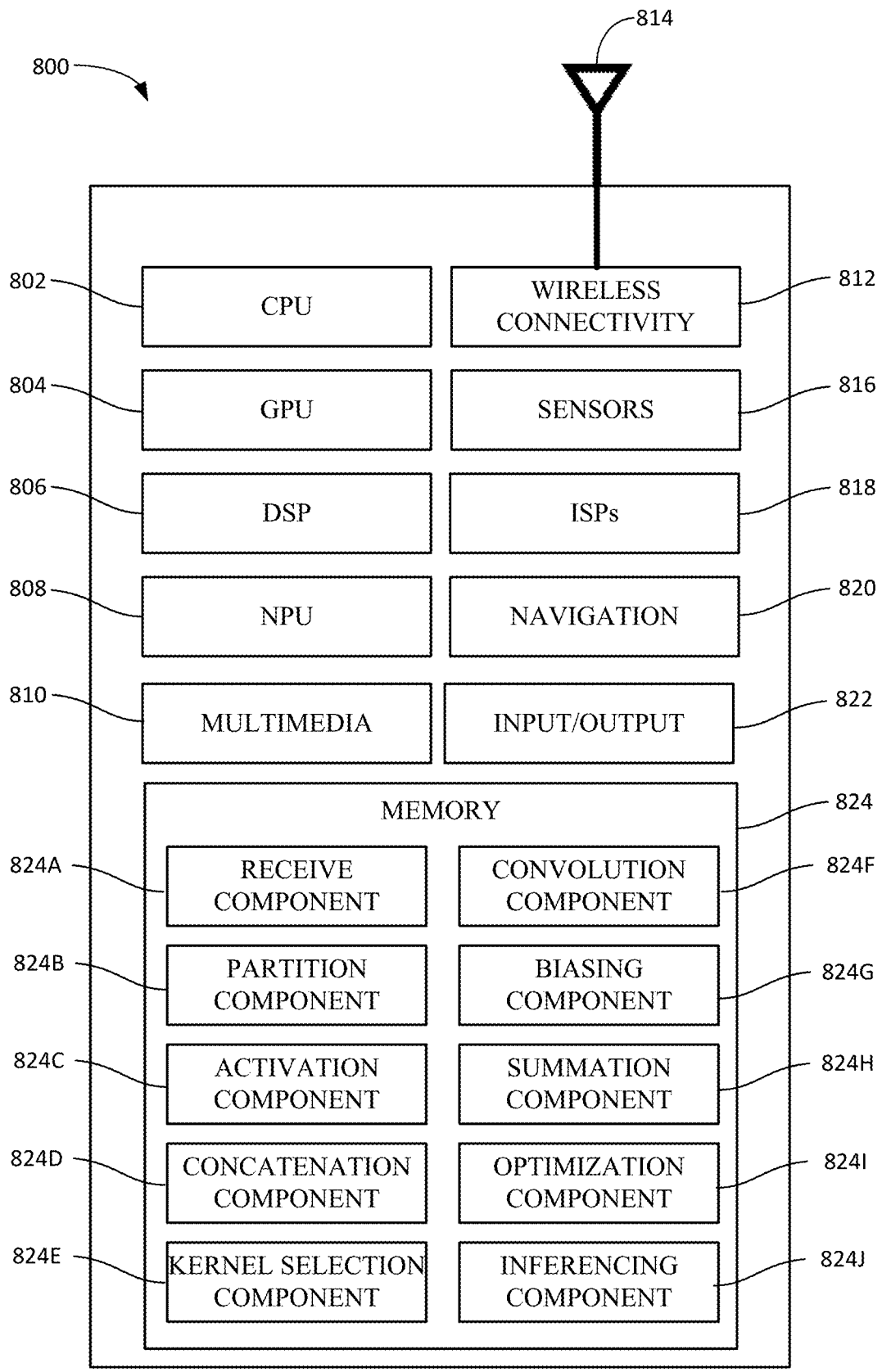
FIG. 8 illustrates an example electronic device, which may be configured to perform the methods described herein.

FIG. 8 illustrates an example electronic device 800. Electronic device 800 may be configured to perform the methods described herein, including with respect to FIGS. 4A-7B.

Electronic device 800 includes a central processing unit (CPU) 802, which in some embodiments may be a multicore CPU. Instructions executed at the CPU 802 may be loaded, for example, from a program memory associated with the CPU 802 or may be loaded from a memory block 824.

Electronic device 800 also includes additional processing blocks tailored to specific functions, such as a graphics processing unit (GPU) 804, a digital signal processor (DSP) 806, a neural processing unit (NPU) 808, a multimedia processing block 810, a multimedia processing unit 810, and a wireless connectivity block 812.

In one implementation, NPU 808 is implemented in one or more of CPU 802, GPU 804, and/or DSP 806.

In some embodiments, wireless connectivity block 812 may include components, for example, for third generation (3G) connectivity, fourth generation (4G) connectivity (e.g., 4G LTE), fifth generation connectivity (e.g., 5G or NR), Wi-Fi connectivity, Bluetooth connectivity, and wireless data transmission standards. Wireless connectivity processing block 812 is further connected to one or more antennas 814.

Electronic device 800 may also include one or more sensor processors 816 associated with any manner of sensor, one or more image signal processors (ISPs) 818 associated with any manner of image sensor, and/or a navigation processor 820, which may include satellite-based positioning system components (e.g., GPS or GLONASS) as well as inertial positioning system components.

Electronic device 800 may also include one or more input and/or output devices 822, such as screens, touch-sensitive surfaces (including touch-sensitive displays), physical buttons, speakers, microphones, and the like.

In some embodiments, one or more of the processors of electronic device 800 may be based on an ARM instruction set.

Electronic device 800 also includes memory 824, which is representative of one or more static and/or dynamic memories, such as a dynamic random access memory, a flash-based static memory, and the like. In this example, memory 824 includes computer-executable components, which may be executed by one or more of the aforementioned processors of electronic device 800. In particular, in this embodiment, memory 824 includes receive component 824A, partition component 824B, activation component 824C, concatenation component 824D, kernel selection component 824E, convolution component 824F, biasing component 824G, summation component 824H, optimization component 824I, and inferencing component 824J. The depicted components, and others not depicted, may be configured to perform various aspects of the methods described herein.

Generally, electronic device 800 and/or components thereof may be configured to perform the methods described herein. In some embodiments, such as where electronic device 800 is a server device, various aspects may be omitted from the embodiment depicted in FIG. 8, such as one or more of multimedia component 810, wireless connectivity component 812, antenna 814, sensors 816, ISPs 818, or navigation 820.

Figure 9:
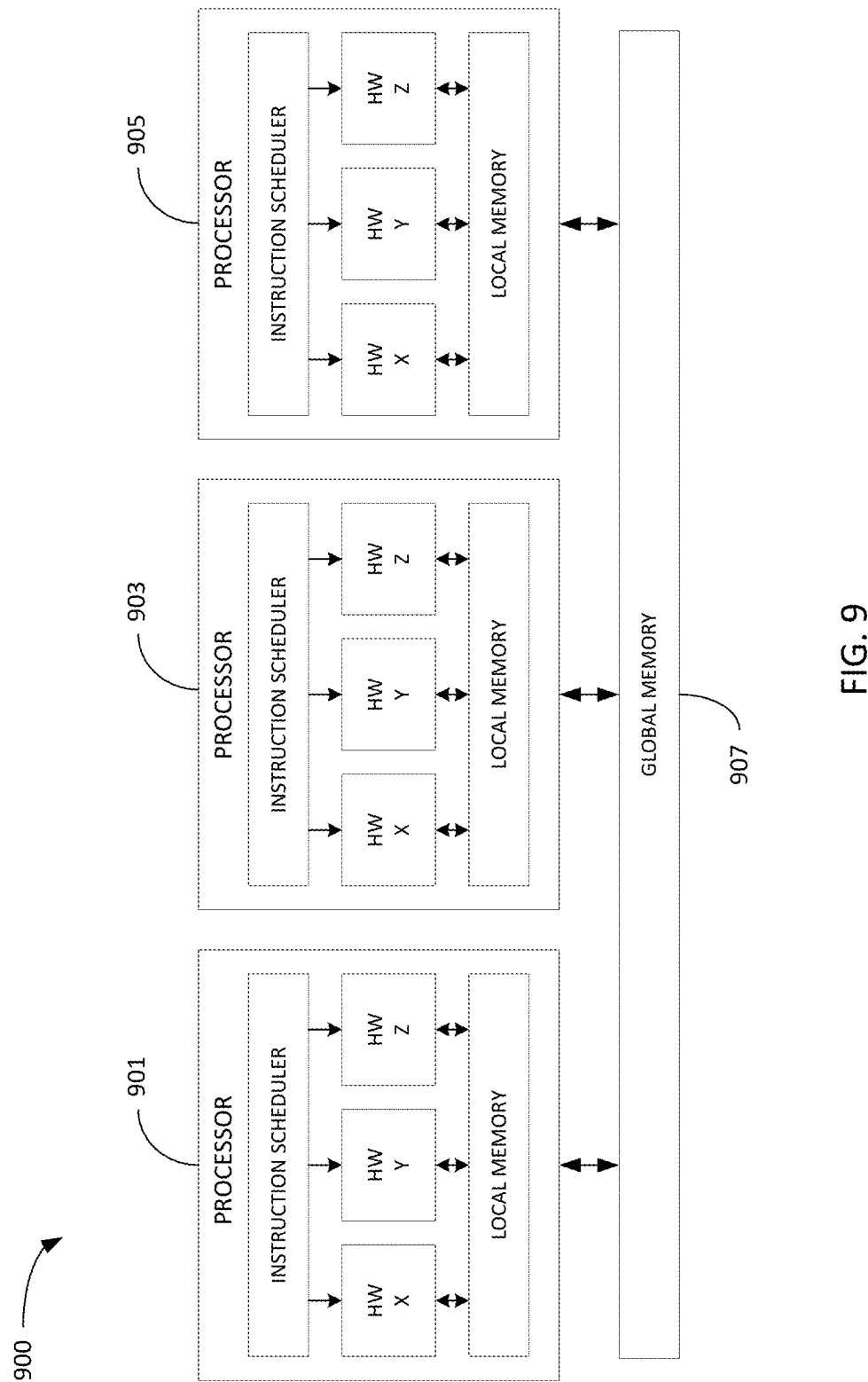
FIG. 9 depicts an example multi-processor processing system, which may be configured to perform the methods described herein.

FIG. 9 depicts an example multi-processor processing system 900 that may be implemented with embodiments described herein. For example, multi-processing system 900 may be representative of various processors of electronic device 800 of FIG. 8.

In this example, system 900 includes processors 901, 903, and 905, but in other examples, any number of individual processors may be used. Further, though depicted similarly, processors 901, 903, and 905 may be representative of various different kinds of processors in an electronic device, such as CPUs, GPUs, DSPs, NPUs, and the like as described herein.

Each of processors 901, 903, and 905 includes an instruction scheduler, various hardware sub-components (e.g., hardware X, hardware Y, and hardware Z), and a local memory. In some embodiments, the local memory may be a tightly coupled memory (TCM). Note that while the components of each of processors 901, 903, and 905 are shown as the same in this example, in other examples, some or each of the processors 901, 903, and 905 may have different hardware configurations, different hardware elements, etc.

Each of processors 901, 903, and 905 is also in data communication with a global memory, such as a random access memory (RAM), or other types of volatile working memory. For example, global memory 907 may be representative of memory 824 of FIG. 8.

In some implementations, in a multi-processor processing system such as 900, one of the processors may act as a master processor. For example, processor 901 may be a master processor in this example. A master processor may include a compiler that, when executed, can determine how a model, such as a neural network, will be processed by various components of processing system 900. For example, hardware parallelism may be implemented by mapping portions of the processing of a model to various hardware (e.g., hardware X, hardware Y, and hardware Z) within a given processor (e.g., processor 901) as well as mapping portions of the processing of the model to other processors (e.g., processors 903 and 905) and their associated hardware. For example, the parallel blocks in the parallel block processing architectures described herein may be mapped to different portions of the various hardware in processors 901, 903, and 905.

EXAMPLE CLAUSES

Clause 1: A method of performing phase selective convolution in a neural network, comprising: receiving a set of first phase pre-activation data and a set of second phase pre-activation data; applying a first activation function to the set of first phase pre-activation data to form a set of first phase activation output; convolving the set of first phase activation output with a first phase convolution kernel to form a first phase output feature map; negating the set of second phase pre-activation data; applying a second activation function to the negated set of second phase pre-activation data to form a set of second phase activation output; convolving the set of second phase activation output with a second phase convolution kernel to form a second phase output feature map; and negating the second phase output feature map.

Clause 2: The method of Clause 1, wherein the first phase convolution kernel and the second phase convolution kernel comprise different weight matrices.

Clause 3: The method of any one of Clauses 1-2, further comprising: adding a first phase bias to the set of first phase pre-activation data; and adding a second phase bias to the set of second phase pre-activation data.

Clause 4: The method of any one of Clauses 1-3, further comprising: performing a first batch normalization on the first phase activation output; and performing a second batch normalization on the second phase activation output.

Clause 5: The method of any one of Clauses 1-4, wherein: the first activation function is a ReLU function, and the second activation function is a ReLU function.

Clause 6: The method of any one of Clauses 1-5, further comprising combining the first phase output feature map with the negated second phase output feature map to form a combined output feature map.

Clause 7: The method of Clause 6, further comprising providing the combined output feature map to another layer of the neural network.

Clause 8: The method of any one of Clauses 6-7, further comprising making an inference with the neural network based at least in part on the combined output feature map.

Clause 9: The method of any one of Clauses 1-8, further comprising: training the neural network based on the first phase output feature map and the second phase output feature map.

Clause 10: The method of Clause 9, wherein training the neural network based on the first phase output feature map and the second phase output feature map comprises adjusting one or more of the first phase convolution kernel and the second phase convolution kernel.

Clause 11: The method of any one of Clauses 1-10, further comprising: receiving multi-phase pre-activation data; and partitioning the multi-phase pre-activation data into the set of first phase pre-activation data and the set of second phase pre-activation data.

Clause 12: A method of inferencing with a neural network comprising a phase selective convolution layer, comprising: receiving a set of first phase pre-activation data and a set of second phase pre-activation data; applying a first activation function to the set of first phase pre-activation data to form a set of first phase activation output; negating the set of second phase pre-activation data; applying a second activation function to the negated set of second phase pre-activation data to form a set of second phase activation output; generating a phase selective convolution kernel based on a first phase convolution kernel and a second phase convolution kernel; performing a phase selective convolution based on the first phase activation output, the second phase activation output, and the phase selective convolution kernel; and outputting a feature map.

Clause 13: The method of Clause 12, wherein generating the phase selective convolution kernel comprises: loading from a memory the first phase convolution kernel; loading from the memory the second phase convolution kernel; for each respective element in the phase selective convolution kernel: determining a sign of a corresponding activation in the first phase activation output; determining a sign of a corresponding activation in the second phase activation output; loading into the respective element in the phase selective convolution kernel a value corresponding to a corresponding element in the first phase convolution kernel if the sign of the corresponding activation in the first phase activation output is greater than 0; and loading into the respective element in the phase selective convolution kernel a value corresponding to a corresponding element in the second phase convolution kernel if the sign of the corresponding activation in the second phase activation output is >0.

Clause 14: The method of any one of Clauses 12-13, wherein the first phase convolution kernel and the second phase convolution kernel comprise different weight matrices.

Clause 15: The method of any one of Clauses 12-14, wherein: the first activation function is a ReLU function, and the second activation function is a ReLU function.

Clause 16: A processing system, comprising: a memory comprising computer-executable instructions; and one or more processors configured to execute the computer-executable instructions and cause the processing system to perform a method in accordance with anyone of Clauses 1-15.

Clause 17: A non-transitory computer-readable medium comprising computer-executable instructions that, when executed by one or more processors of a processing system, cause the processing system to perform a method in accordance with any one of Clauses 1-15.

Clause 18: A computer program product embodied on a computer-readable storage medium comprising code for performing a method in accordance with any one of Clauses 1-15.

Clause 19: A processing system, comprising: means for performing a method in accordance with any one of Clauses 1-15.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of performing phase selective convolution in a neural network, the method comprising:
   receiving, at one or more neurons of a current layer of the neural network from one or more neurons of a previous layer of the neural network, pre-activation data, the one or more neurons being associated with one or more processors, each of the one or more neurons being associated with a set of one or more weights, and the set of one or more weights being stored in memory, wherein the pre-activation data comprises data before applying an activation function at the current layer of the neural network, and wherein the pre-activation data comprises a first set of positive pre-activation data and a set of negative pre-activation data;
   applying, at the one or more neurons of the current layer of the neural network, a first activation function to the first set of positive pre-activation data to form a first set of activation output;
   convolving, at the one or more neurons of the current layer of the neural network, the first set of activation output with a first convolution kernel to form a first output feature map;
   negating, at the one or more neurons of the current layer of the neural network, the set of negative pre-activation data to form a second set of positive pre-activation data;
   applying, at the one or more neurons of the current layer of the neural network, a second activation function to the second set of positive pre-activation data to form a second set of activation output;
   convolving, at the one or more neurons of the current layer of the neural network, the second set of activation output with a second convolution kernel to form a second output feature map;
   negating, at the one or more neurons of the current layer of the neural network, the second output feature map;
   combining, at the one or more neurons of the current layer of the neural network, the first output feature map with the negated second output feature map to form a combined output feature map; and
   training the neural network based on the combined output feature map to perform feature extraction and inference generation, the training including updating one or more weights associated with the one or more neurons.

2. The method of claim 1, wherein the first convolution kernel and the second convolution kernel comprise different weight matrices, the weight matrices comprising the set of one or more weights stored in the memory.

3. The method of claim 1, further comprising:
   adding a first phase bias to the first set of positive pre-activation data; and
   adding a second phase bias to the set of negative pre-activation data.

4. The method of claim 1, further comprising:
   performing a first batch normalization on the first set of activation output; and
   performing a second batch normalization on the second set of activation output.

5. The method of claim 1, wherein:
   the first activation function is a rectified linear unit (ReLU) function; and
   the second activation function is a ReLU function.

6. The method of claim 1, further comprising providing the combined output feature map to another layer of the neural network.

7. The method of claim 1, further comprising partitioning the pre-activation data into the first set of positive pre-activation data and the set of negative pre-activation data.

8. The method of claim 1, further comprising generating a visual feature recognition inference using the trained neural network machine learning model.

9. A method of inferencing with a neural network comprising a phase selective convolution layer, the method comprising:
   receiving, at one or more neurons of a current layer of the neural network from a previous layer of the neural network, pre-activation data, the one or more neurons being associated with one or more processors, each of the one or more neurons being associated with a set of one or more weights, and the set of one or more weights being stored in memory, wherein the pre-activation data comprises data before applying an activation function at the current layer of the neural network, and wherein the pre-activation data comprises a first set of positive pre-activation data and a set of negative pre-activation data;
   applying, at the one or more neurons of the current layer of the neural network, a first activation function to the first set of positive pre-activation data to form a first set of activation output;
   negating, at the one or more neurons of the current layer of the neural network, the set of negative pre-activation data to form a second set of positive pre-activation data;
   applying, at the one or more neurons of the current layer of the neural network, a second activation function to the second set of positive pre-activation data to form a second set of activation output;
   generating a phase selective convolution kernel, wherein the phase selective convolution kernel includes a subset of weights of a first phase convolution kernel associated with the first set of positive pre-activation data and a subset of weights of a second phase convolution kernel associated with the set of negative pre-activation data;

performing a phase selective convolution based on the first set of activation output, the second set of activation output, and the phase selective convolution kernel;

outputting a feature map based on the performance of the phase selective convolution; and generating an inference with the neural network based at least in part on the feature map.

10. The method of claim 9, wherein generating the phase selective convolution kernel comprises:

loading from the memory the first phase convolution kernel;

loading from the memory the second phase convolution kernel; and for each respective element in the phase selective convolution kernel:

determining a sign of a corresponding activation in the first set of activation output;

determining a sign of a corresponding activation in the second set of activation output;

loading into the respective element in the phase selective convolution kernel a value corresponding to a corresponding element in the first phase convolution kernel if the sign of the corresponding activation in the first activation output is positive; and loading into the respective element in the phase selective convolution kernel a value corresponding to a corresponding element in the second phase convolution kernel if the sign of the corresponding activation in the second set of activation output is positive.

11. The method of claim 9, wherein the first phase convolution kernel and the second phase convolution kernel comprise different weight matrices, the weight matrices comprising the set of one or more weights stored in memory.

12. The method of claim 9, wherein:

the first activation function is a rectified linear unit (ReLU) function; and the second activation function is a ReLU function.

13. A processing system configured to perform phase selective convolution in a neural network, the processing system comprising:

memory comprising a neural network machine learning model;

one or more processors associated with a plurality of neurons of the neural network, the one or more processors configured to execute the neural network machine learning model and cause the processing system to:

receive, at one or more neurons of a current layer of the neural network from a previous layer of the neural network, pre-activation data, the one or more neurons being from the plurality of neurons, each of the one or more neurons being associated with a set of one or more weights, and the set of one or more weights being stored in the memory, wherein the pre-activation data comprises data before applying an activation function at the current layer of the neural network, and wherein the pre-activation data comprises a first set of positive pre-activation data and a set of negative pre-activation data;

apply, at the one or more neurons of the current layer of the neural network, a first activation function to the first set of positive pre-activation data to form a first set of activation output;

convolve, at the one or more neurons of the current layer of the neural network, the first set of activation output with a first convolution kernel to form a first output feature map;

negate, at the one or more neurons of the current layer of the neural network, the set of negative pre-activation data to form a second set of positive pre-activation data;

apply, at the one or more neurons of the current layer of the neural network, a second activation function to the second set of positive pre-activation data to form a second set of activation output;

convolve, at the one or more neurons of the current layer of the neural network, the second set of activation output with a second convolution kernel to form a second output feature map;

negate, at the one or more neurons of the current layer of the neural network, the second output feature map;

combine, at the one or more neurons of the current layer of the neural network, the first output feature map with the negated second output feature map to form a combined output feature map; and train the neural network machine learning model based on the combined output feature map to perform feature extraction and inference generation, the training including updating one or more of the weights associated with the one or more neurons.

14. The processing system of claim 13, wherein the first convolution kernel and the second convolution kernel comprise different weight matrices, the weight matrices comprising the plurality of neurons stored in the memory.

15. The processing system of claim 13, wherein the one or more processors are further configured to cause the processing system to:

add a first phase bias to the first set of positive pre-activation data; and add a second phase bias to the set of negative pre-activation data.

16. The processing system of claim 13, wherein the one or more processors are further configured to cause the processing system to:

perform a first batch normalization on the first set of activation output; and perform a second batch normalization on the second set of activation output.

17. The processing system of claim 13, wherein:

the first activation function is a rectified linear unit (ReLU) function; and the second activation function is a ReLU function.

18. The processing system of claim 13, wherein the one or more processors are further configured to cause the processing system to provide the combined output feature map to another layer of the neural network.

19. The processing system of claim 13, wherein the one or more processors are further configured to cause the processing system to partition the pre-activation data into the first set of positive pre-activation data and the set of negative pre-activation data.

20. A processing system configured to perform phase selective convolution in a neural network, the processing system comprising:

a memory comprising a neural network machine learning model;

one or more processors configured to execute the neural network machine learning model and cause the processing system to:

receive, at one or more neurons of a current layer of the neural network from a previous layer of the neural network, pre-activation data, the one ore more neurons being from the plurality of each of the one or more neurons being associated with a set of one or more weights, and the set of one or more weights being stored in the memory, wherein the pre-activation data comprises data before applying an activation function at the current layer of the neural network, and wherein the pre-activation data comprises a first set of positive pre-activation data and a set of negative pre-activation data;

apply, at one or more neurons of the current layer of the neural network, a first activation function to the first set of positive pre-activation data to form a first set of activation output;

negate, at one or more neurons of the current layer of the neural network, the set of negative pre-activation data to form a second set of positive pre-activation data;

apply, at one or more neurons of the current layer of the neural network, a second activation function to the second set of positive pre-activation data to form a second set of activation output;

generate a phase selective convolution kernel, wherein the phase selective convolution kernel includes a subset of weights of a first phase convolution kernel associated with the first set of positive pre-activation data and a subset of weights of a second phase convolution kernel associated with the set of negative pre-activation data;

perform a phase selective convolution based on the first set of activation output, the second set of activation output, and the phase selective convolution kernel;

output a feature map based on the performance of the phase selective convolution; and generate an inference with the neural network based at least in part on the feature map.

21. The processing system of claim 20, wherein in order to generate the phase selective convolution kernel, the one or more processors are further configured to cause the processing system to:

load from the memory the first phase convolution kernel;

load from the memory the second phase convolution kernel; and for each respective element in the phase selective convolution kernel:

determine a sign of a corresponding activation in the first set of activation output;

determine a sign of a corresponding activation in the second set of activation output;

load into the respective element in the phase selective convolution kernel a value corresponding to a corresponding element in the first phase convolution kernel if the sign of the corresponding activation in the first activation output is positive; and loading into the respective element in the phase selective convolution kernel a value corresponding to a corresponding element in the second phase convolution kernel if the sign of the corresponding activation in the second set of activation output is positive.

22. The processing system of claim 20, wherein the first phase convolution kernel and the second phase convolution kernel comprise different weight matrices, the weight matrices comprising the one or more weights stored in the memory.

23. The processing system of claim 20, wherein:
the first activation function is a rectified linear unit (ReLU) function; and
the second activation function is a ReLU function.

* * * * *